United States Patent
Raghavan et al.

(10) Patent No.: US 11,444,735 B2
(45) Date of Patent: Sep. 13, 2022

(54) TECHNIQUES FOR USING A DATA CHANNEL FOR BEAM REFINEMENT

(71) Applicant: QUALCOMM Incorporated, San Diego, CA (US)

(72) Inventors: Vasanthan Raghavan, West Windsor Township, NJ (US); Junyi Li, Franklin Park, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/144,841

(22) Filed: Jan. 8, 2021

(65) Prior Publication Data

US 2021/0391965 A1 Dec. 16, 2021

Related U.S. Application Data

(60) Provisional application No. 63/039,298, filed on Jun. 15, 2020.

(51) Int. Cl.
*H04L 5/00* (2006.01)
*H04B 7/0417* (2017.01)
*H04W 72/04* (2009.01)

(52) U.S. Cl.
CPC ......... *H04L 5/0051* (2013.01); *H04B 7/0417* (2013.01); *H04W 72/044* (2013.01)

(58) Field of Classification Search
None
See application file for complete search history.

(56) References Cited

U.S. PATENT DOCUMENTS

| | | | |
|---|---|---|---|
| 10,271,223 B2 | 4/2019 | Yu et al. | |
| 2018/0109304 A1* | 4/2018 | Wiberg | H04B 7/0639 |
| 2018/0192356 A1* | 7/2018 | Trainin | H04B 17/336 |
| 2019/0052502 A1* | 2/2019 | Ren | H04B 7/26 |
| 2019/0089435 A1* | 3/2019 | Mondal | H04B 7/088 |
| 2019/0123864 A1* | 4/2019 | Zhang | H04L 5/0023 |
| 2019/0334675 A1* | 10/2019 | Lu | H04L 5/0048 |
| 2019/0341974 A1* | 11/2019 | Kim | H04B 7/0478 |

(Continued)

OTHER PUBLICATIONS

International Search Report and Written Opinion—PCT/US2021/030870—ISA/EPO—dated Aug. 4, 2021.

(Continued)

*Primary Examiner* — Phirin Sam
(74) *Attorney, Agent, or Firm* — Holland & Hart LLP

(57) ABSTRACT

Methods, systems, and devices for wireless communications are described. For example, a first wireless device may transmit, via a first beam, a first set of data and a first reference signal associated with the data on a data channel for beam refinement. The first wireless device may further transmit, via a second beam, a second set of data and a second reference signal on the data channel for beam refinement. A second device may receive the first set of data and first reference signal in addition to receiving the second set of data and second reference signal. The second device may transmit, to the first device, beam refinement feedback information for the first beam and the second beam based on receiving the first reference signal and the second reference signal on the data channel. Thus, the first device may refine beams based on a data transmission over a data channel.

28 Claims, 16 Drawing Sheets

(56) References Cited

U.S. PATENT DOCUMENTS

| | | | |
|---|---|---|---|
| 2019/0349960 A1* | 11/2019 | Li | H04L 5/0055 |
| 2020/0028609 A1 | 1/2020 | Ahn et al. | |
| 2020/0028628 A1* | 1/2020 | Lei | H04L 5/0055 |
| 2020/0059867 A1* | 2/2020 | Haghighat | H04W 52/42 |
| 2020/0112953 A1* | 4/2020 | Bendlin | H04B 7/15542 |
| 2020/0145998 A1 | 5/2020 | Sun et al. | |
| 2021/0111778 A1* | 4/2021 | Jung | H04L 5/00 |

OTHER PUBLICATIONS

Samsung: "UL Beam Management", 3GPP TSG RAN WG1 #89, 3GPP Draft, R1-1707952, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), 6 Pages, XP051273150, May 6, 2017 (May 6, 2017), Retrieved from the Internet: URL: http://www.3gpp.org/ftp/Meetings_3GPP_SYNC/RAN1/Docs/ [retrieved on May 14, 2017], chapter 5, p. 5.

* cited by examiner

TECHNIQUES FOR USING A DATA CHANNEL FOR BEAM REFINEMENT

CROSS REFERENCE

The present Application for patent claims the benefit of U.S. Provisional Patent Application No. 63/039,298 by RAGHAVAN et al., entitled "TECHNIQUES FOR USING A DATA CHANNEL FOR BEAM REFINEMENT," filed Jun. 15, 2020, assigned to the assignee hereof, and expressly incorporated by reference in its entirety herein.

FIELD OF TECHNOLOGY

The following relates generally to wireless communications and more specifically to techniques for using a data channel for beam refinement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support beamforming techniques, which may increase spectral efficiency and provide an improved signal-to-noise ratio (SNR) for communications between wireless devices. Some high-frequency communications (e.g., millimeter wave (mmW) communications) may use narrow, highly directional beams. In such cases, communications between devices may initially start with wider beams and be refined to relatively narrower beams. Although beamforming may increase spectrum usage, beam refinement procedures may be based on sparse or infrequent reference signals.

SUMMARY

The described techniques relate to improved methods, systems, devices, and apparatuses that support techniques for using a data channel for beam refinement. Generally, the described techniques provide for efficient uplink and downlink beam refinement between a base station and UE using a demodulation reference signal (DMRS) of a data channel (e.g., physical downlink shared channel (PDSCH) or physical uplink shared channel (PUSCH)). Using data resources for DMRSs that may be used for beam refinement may allow for faster beam refinement than using control channel reference signals (e.g., a channel state information reference signal (CSI-RS) or a sounding reference signal (SRS)), which may result in improved SNR and a higher modulation and coding scheme (MCS), thereby enabling more efficient communications after beam refinement. Specifically, a data channel, which may be referred to as a PXSCH (e.g., including PUSCH, PDSCH, or other data channels) may include one or more time periods (e.g., slots) that may be restructured to include at least two non-overlapping resource element (RE) groups. Each RE group may include data and DMRS resources. A different beam at the transmitting device (e.g., the UE or base station) may be used to transmit each RE group, effectively beam sweeping during data transmission. The measuring device (e.g., the base station or UE), which receives the data channel, may be configured to feed back information about the beam sweep based on the DMRS measurements.

As described herein, a first wireless device may transmit, via a first beam, a first set of data and a first reference signal (e.g., DMRS) associated with the data on a first RE group of a data channel (e.g., PUSCH or PDSCH) for beam refinement. The first wireless device may also transmit, via a second beam, a second set of data and a second reference signal on a second RE group of the data channel for beam refinement. A second wireless device (e.g., the measuring device) may receive the first set of data and first reference signal and receive the second set of data and second reference signal. The second device may transmit, to the first wireless device, beam refinement feedback information for the first beam and the second beam based on receiving the first reference signal and the second reference signal on the data channel. Thus, the first wireless device may efficiently refine its beams based on the data transmission.

A method of wireless communications at a first wireless device is described. The method may include transmitting, via a first beam, a first set of data and a first reference signal associated with the data on a data channel for beam refinement, transmitting, via a second beam, a second set of data and a second reference signal on the data channel for the beam refinement, and receiving, from a second wireless device, beam refinement feedback information for the first beam and the second beam based on transmitting the first reference signal and the second reference signal on the data channel.

An apparatus for wireless communications at a first wireless device is described. The apparatus may include a processor, memory coupled with the processor, and instructions stored in the memory. The instructions may be executable by the processor to cause the apparatus to transmit, via a first beam, a first set of data and a first reference signal associated with the data on a data channel for beam refinement, transmit, via a second beam, a second set of data and a second reference signal on the data channel for the beam refinement, and receive, from a second wireless device, beam refinement feedback information for the first beam and the second beam based on transmitting the first reference signal and the second reference signal on the data channel.

Another apparatus for wireless communications at a first wireless device is described. The apparatus may include means for transmitting, via a first beam, a first set of data and a first reference signal associated with the data on a data channel for beam refinement, transmitting, via a second beam, a second set of data and a second reference signal on the data channel for the beam refinement, and receiving, from a second wireless device, beam refinement feedback information for the first beam and the second beam based on transmitting the first reference signal and the second reference signal on the data channel.

A non-transitory computer-readable medium storing code for wireless communications at a first wireless device is described. The code may include instructions executable by a processor to transmit, via a first beam, a first set of data and a first reference signal associated with the data on a data channel for beam refinement, transmit, via a second beam, a second set of data and a second reference signal on the data channel for the beam refinement, and receive, from a second wireless device, beam refinement feedback information for the first beam and the second beam based on transmitting the first reference signal and the second reference signal on the data channel.

Some examples of the method, apparatuses, and non-transitory computer-readable medium described herein may further include operations, features, means, or instructions for receiving an indication to perform the beam refinement, where transmitting the first reference signal and the second reference signal may be based on the indication.

Some examples of the method, apparatuses, and non-transitory computer-readable medium described herein may further include operations, features, means, or instructions for transmitting an MCS request for adjusting an MCS based on receiving the indication to perform the beam refinement.

Some examples of the method, apparatuses, and non-transitory computer-readable medium described herein may further include operations, features, means, or instructions for receiving a beam sweep configuration for dynamic beam refinement procedures using the data channel. In some examples of the method, apparatuses, and non-transitory computer-readable medium described herein, the beam sweep configuration indicates a data channel slot structure for the beam refinement using the first reference signal and the second reference signal. In some examples of the method, apparatuses, and non-transitory computer-readable medium described herein, the beam sweep configuration indicates a number of beams to sweep for the beam refinement.

In some examples of the method, apparatuses, and non-transitory computer-readable medium described herein, the first set of data and the first reference signal may be transmitted in a first set of symbols, and the second set of data and the second reference signal may be transmitted in a second set of symbols.

In some examples of the method, apparatuses, and non-transitory computer-readable medium described herein, the first reference signal and the second reference signal may be each transmitted with a slot time interval of the data channel.

Some examples of the method, apparatuses, and non-transitory computer-readable medium described herein may further include operations, features, means, or instructions for selecting the first beam or the second beam for subsequent communication based on the received beam refinement feedback information.

In some examples of the method, apparatuses, and non-transitory computer-readable medium described herein, the feedback may be received via a control information message, a radio resource control (RRC) message, or a medium access control (MAC)-control element (CE).

In some examples of the method, apparatuses, and non-transitory computer-readable medium described herein, the first reference signal and the second reference signal include DMRSs.

In some examples of the method, apparatuses, and non-transitory computer-readable medium described herein, the first wireless device may be a UE, and the data channel may be a PUSCH.

In some examples of the method, apparatuses, and non-transitory computer-readable medium described herein, the first wireless device may be a base station, and the data channel may be a PDSCH.

A method of wireless communications at a second wireless device is described. The method may include receiving, via a first beam of a first wireless device, a first set of data and a first reference signal associated with the data on a data channel for beam refinement, receiving, via a second beam of the first wireless device, a second set of data and a second reference signal on the data channel for the beam refinement, and transmitting, to the first wireless device, beam refinement feedback information for the first beam and the second beam based on receiving the first reference signal and the second reference signal on the data channel.

An apparatus for wireless communications at a second wireless device is described. The apparatus may include a processor, memory coupled with the processor, and instructions stored in the memory. The instructions may be executable by the processor to cause the apparatus to receive, via a first beam of a first wireless device, a first set of data and a first reference signal associated with the data on a data channel for beam refinement, receive, via a second beam of the first wireless device, a second set of data and a second reference signal on the data channel for the beam refinement, and transmit, to the first wireless device, beam refinement feedback information for the first beam and the second beam based on receiving the first reference signal and the second reference signal on the data channel.

Another apparatus for wireless communications at a second wireless device is described. The apparatus may include means for receiving, via a first beam of a first wireless device, a first set of data and a first reference signal associated with the data on a data channel for beam refinement, receiving, via a second beam of the first wireless device, a second set of data and a second reference signal on the data channel for the beam refinement, and transmitting, to the first wireless device, beam refinement feedback information for the first beam and the second beam based on receiving the first reference signal and the second reference signal on the data channel.

A non-transitory computer-readable medium storing code for wireless communications at a second wireless device is described. The code may include instructions executable by a processor to receive, via a first beam of a first wireless device, a first set of data and a first reference signal associated with the data on a data channel for beam refinement, receive, via a second beam of the first wireless device, a second set of data and a second reference signal on the data channel for the beam refinement, and transmit, to the first wireless device, beam refinement feedback information for the first beam and the second beam based on receiving the first reference signal and the second reference signal on the data channel.

Some examples of the method, apparatuses, and non-transitory computer-readable medium described herein may further include operations, features, means, or instructions for measuring a first reference signal received power (RSRP) of the first reference signal, and measuring a second RSRP of the second reference signal.

In some examples of the method, apparatuses, and non-transitory computer-readable medium described herein, the beam refinement feedback information includes an indication of the first RSRP and the second RSRP. In some examples of the method, apparatuses, and non-transitory computer-readable medium described herein, the beam refinement feedback information includes an indication that the first beam may be a preferred beam based at least on part on the first RSRP being greater than the second RSRP.

Some examples of the method, apparatuses, and non-transitory computer-readable medium described herein may further include operations, features, means, or instructions for receiving a feedback configuration for reporting beam feedback associated with the beam refinement via a data channel.

Some examples of the method, apparatuses, and non-transitory computer-readable medium described herein may further include operations, features, means, or instructions for transmitting an indication to perform the beam refinement. Some examples of the method, apparatuses, and non-transitory computer-readable medium described herein may further include operations, features, means, or instructions for receiving an MCS request for adjusting an MCS based on transmitting the indication to perform the beam refinement.

Some examples of the method, apparatuses, and non-transitory computer-readable medium described herein may further include operations, features, means, or instructions for transmitting a beam sweep configuration for dynamic beam refinement procedures using the data channel. In some examples of the method, apparatuses, and non-transitory computer-readable medium described herein, the beam sweep configuration indicates a data channel slot structure for the beam refinement using the first reference signal and the second reference signal. In some examples of the method, apparatuses, and non-transitory computer-readable medium described herein, the beam sweep configuration indicates a number of beams to sweep for the beam refinement.

In some examples of the method, apparatuses, and non-transitory computer-readable medium described herein, the first set of data and the first reference signal may be received in a first set of symbols, and the second set of data and the second reference signal may be received in a second set of symbols.

In some examples of the method, apparatuses, and non-transitory computer-readable medium described herein, the first reference signal and the second reference signal may be each received within a slot time interval of the data channel.

In some examples of the method, apparatuses, and non-transitory computer-readable medium described herein, the feedback may be transmitted via a control information message, an RRC message, or a MAC-CE.

In some examples of the method, apparatuses, and non-transitory computer-readable medium described herein, the first reference signal and the second reference signal may be DMRSs.

In some examples of the method, apparatuses, and non-transitory computer-readable medium described herein, the second wireless device may be a UE, and the data channel may be a PDSCH.

In some examples of the method, apparatuses, and non-transitory computer-readable medium described herein, the second wireless device may be a base station, and the data channel may be a PUSCH.

DETAILED DESCRIPTION

Figure 1:
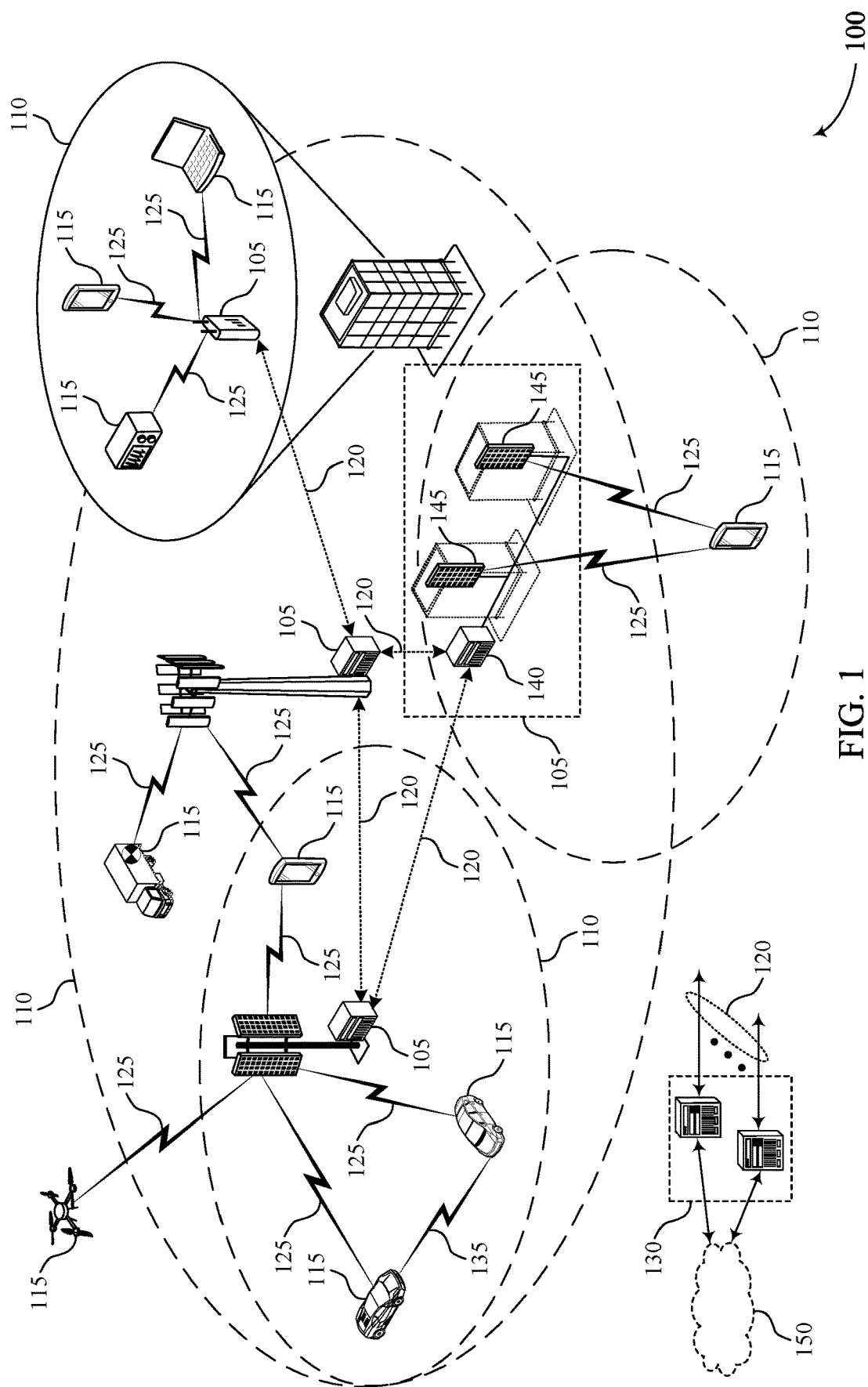
FIG. 1 illustrates an example of a wireless communications system that supports techniques for using a data channel for beam refinement in accordance with aspects of the present disclosure.

Some wireless communication networks may operate in relatively high frequency bands. For example, mmW frequency bands may range between about 24.25 gigahertz (GHz) to about 114.25 GHz, and propagation loss may be relatively greater at such high frequencies due to corresponding increases in path, penetration, and blockage losses. Beamforming may thus be used to direct relatively narrow beams to improve beam quality and reduce propagation loss. In some cases, cell acquisition may be difficult with a narrow beam. As a result, a wireless device (e.g., a base station or UE) may use a relatively wider, less refined beam for initial cell acquisition and synchronization, which may be referred to as a P1 procedure for a UE and U1 procedure for a base station. Then, the device may refine the wide beam to a narrow beam after the device is connected to the cell, which may be referred to as P2 or P3 procedures for the downlink and U2 or U3 procedures for the uplink. P1 and U1 procedures may be performed based on a synchronization signal block (SSB). P2 (i.e., U3) and P3 (i.e., U2) procedures may be performed (e.g., in a mission mode) based on a CSI-RS or an SRS. The SRS or CSI-RS may, however, occur relatively sparsely (e.g., infrequently) compared to data resources. As such, the use of CSI-RS or SRS for beam management may result in inefficient beam refinement procedures, leading to delays in identifying one or more preferred narrow beam for communications between devices.

The techniques described herein provide for efficient uplink and downlink beam refinement between a base station and UE using a DMRS of a data channel (e.g., PDSCH or PUSCH). In some cases, beam refinement procedures may be limited to control channels. Using data resources for additional DMRS signaling that may be used for beam refinement, however, may allow for faster beam refinement than using control channel reference signals (e.g., CSI-RS, SRS), which may result in improved SNR and a higher MCS for more efficient communications after beam refinement. Specifically, a PXSCH (e.g., PUSCH or PDSCH) time period (e.g., a slot) may be restructured to include at least two non-overlapping RE groups. Each RE group may include data and DMRS resources. A different beam at the transmitting device (e.g., the UE or base station) may be used to transmit each RE group, effectively beam sweeping the RE groups during data transmission.

The measuring device (e.g., the base station or UE), which receives the data channel, may be configured to perform DMRS measurements and feed back information about the beam sweep based on the DMRS measurements (e.g., RSRP). For example, the measuring device may select a symbol or beam of the data channel with a relatively highest RSRP as a reference signal for beam refinement, beam management, or both. In addition, the described techniques may be used in addition to or as an alternative to CSI-RS and SRS. The described techniques may allow for faster beam refinement at both a base station and UE than other methods (e.g., schemes that do not rely on DMRS(s) of a data channel). Thus, this disclosure may improve communication quality by reducing latency in reaching an optimal beam and MCS.

Aspects of the disclosure are initially described in the context of wireless communications systems. Aspects of the disclosure are further illustrated by and described with reference to apparatus diagrams, system diagrams, and flowcharts that relate to techniques for using a data channel for beam refinement.

FIG. 1 illustrates an example of a wireless communications system 100 that supports techniques for using a data channel for beam refinement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, an RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme, the coding rate of the modulation scheme, or both). Thus, the more REs that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 GHz. Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits ssociated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS, which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 may support beam refinement procedures via data channels. For example, a first wireless device may transmit, via a first beam, a first set of data and a first reference signal associated with the data on a data channel for beam refinement, and transmit, via a second beam, a second set of data and a second reference signal on the data channel for beam refinement. A second wireless device may receive the first set of data and first reference signal in addition to receiving the second set of data and second reference signal. The second wireless device may transmit, to the first wireless device, beam refinement feedback information for the first beam and the second beam based on receiving the first reference signal and the second reference signal on the data channel. Thus, the first wireless device may refine beams based on a data transmission in addition to control reference signals, which may be faster than refining beams based on control reference signals that may not be transmitted via a data channel (e.g., SRS and CSI-RS). In some examples, the first wireless device may be a UE 115, and the second wireless device may be a base station 105. In another example, the first wireless device may be a base station 105, and the second wireless device may be a UE 115. The aspects described herein provide examples of features performed from the perspective of the first wireless device being a UE 115, and the second wireless device being a base station 105, however, the following description may also apply to the perspective of the first wireless device being a base station 105, and the second wireless device being a UE 115. That is, operations performed by a UE 115 and a base station 105 may be respectively performed by a UE 115, a base station 105, or another wireless device, and the examples provided herein should not be construed as limiting. For instance, the operations shown as performed by a UE 115 may be performed by a base station 105, and the operations shown as performed by a base station 105 may be performed by a UE 115.

Figure 2:
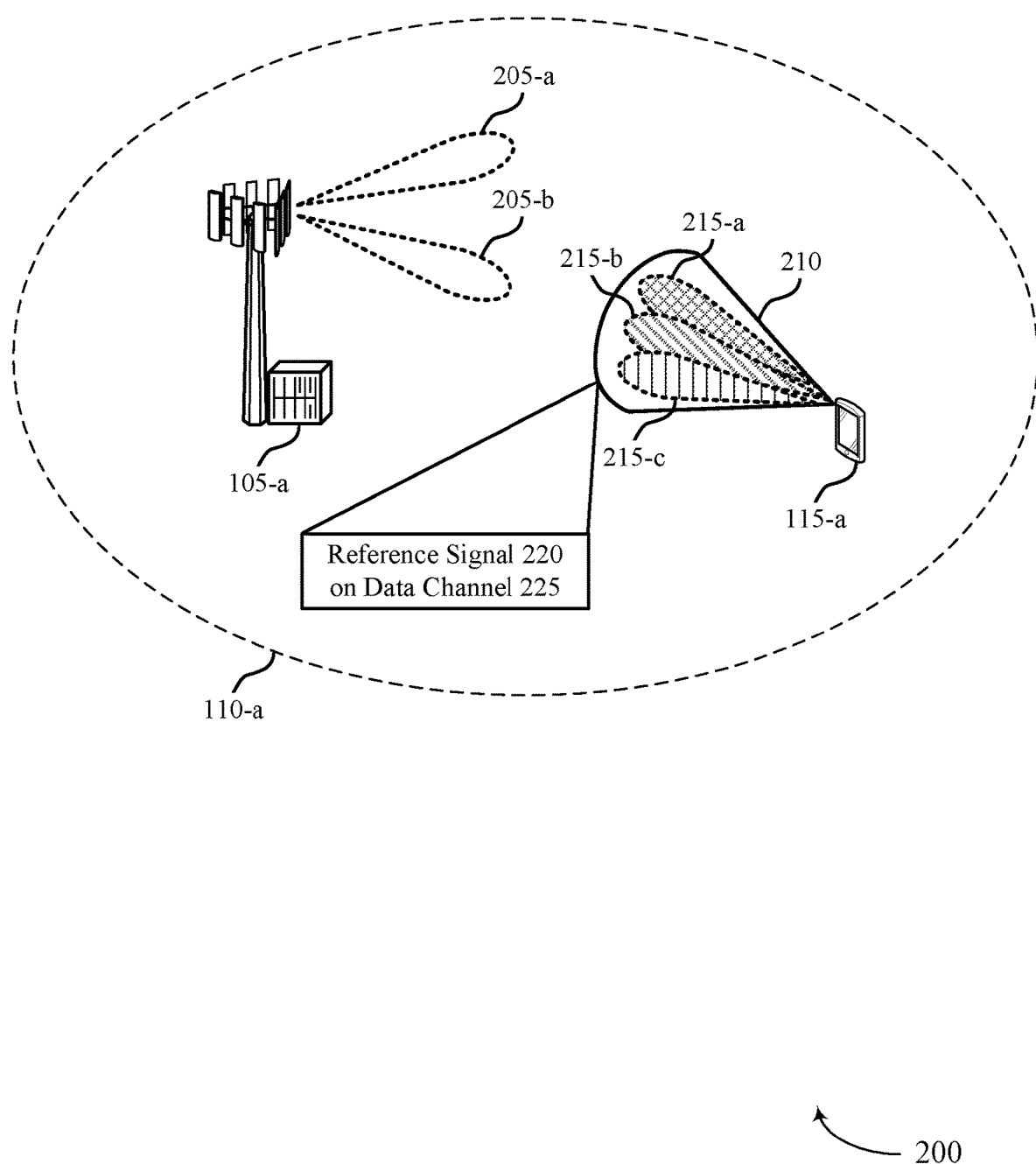
FIG. 2 illustrates an example of a wireless communications system that supports techniques for using a data channel for beam refinement in accordance with aspects of the present disclosure.

FIG. 2 illustrates an example of a wireless communications system 200 that supports techniques for using a data channel for beam refinement in accordance with aspects of the present disclosure. In some examples, wireless communications system 200 may implement aspects of wireless communications system 100. Wireless communications system 200 may be an example of a mmW system that includes a UE 115-a and a base station 105-a within coverage area 110-a, which may be examples of a UE 115 and a base station 105 as described with reference to FIG. 1. As described herein, some aspects relate to improving the efficiency of beam refinement using a data channel.

During cell synchronization, the base station 105-a may transmit a SSB sweep on beams 205-a and 205-b allowing for coarse training of the UE 115-a beam 210 (e.g., an initial beam). The UE 115-a may use beam 210, which may be a relatively wide beamwidth beam, to roughly capture the angle or direction of the incoming signal power of the SSB from the base station 105-a. Additionally, the UE 115-a may further improve the directionality of beam 210 (e.g., via beam refinement) for data transmission using a reference signal, for example, CSI-RS or SRS. As an example, the UE 115-a may perform beam sweeping for receiving a CSI-RS transmission, for example, based on the transmit beam 205-b of the base station 105-a, where the base station 105-a may transmit the CSI-RS via the same transmit beam 205-b (or other beams 205) according to a periodic schedule. In other examples, the UE 115-a may use SRS transmission(s) to check the quality of a transmit beam (e.g., beam 210 or a beam 215) at the UE 115-a. Additionally or alternatively to CSI-RS or SRS, the UE 115-a may use a data channel for beam refinement as the periodic transmission of the CSI-RS or SRS beam training reference signals may be infrequent relative to data transmissions from UE 115-a to base station 105-a.

In some examples, the UE 115-a may transmit a reference signal 220 (e.g., DMRS) on a data channel 225 via a first beam 215-a over a first duration (e.g., slot or symbol). A second reference signal 220 may be subsequently transmitted on the data channel 225 via a second beam 215-b over a second duration. In some cases, a third reference signal 220 may be subsequently transmitted on the data channel 225 via a third beam 215-c over a third duration. Although two transmit beams 205 (of the base station 105-a) and three transmit beams 215 (of the UE 115-a) are shown in FIG. 2, the reference signal 220 may be transmitted over more or fewer beams in various example beam sweeping procedures at UE 115-a. Additionally, although three durations are described, the reference signal 220 may be transmitted over more or fewer durations.

Each duration may allow the base station 105-a to measure the reference signal 220 on the data channel 225 via a different respective UE beam 215-a, 215-b, and 215-c. The base station 105-a may indicate to the UE 115-a what beam 215 to use for subsequent communications based on a measured signal quality of the reference signal 220 (e.g., RSRP). For example, the base station 105-a may indicate an index of the reference signal 220 resource, for example, a symbol quantity, used in the reference signal sweep to indicate the determined improved beam 215. The indication may indicate that the second swept beam 215-b may be used for future communications (e.g., based on the quality of the beam). Additionally or alternatively, the base station may report the RSRP measurements to the UE 115-a to enable the UE 115-a to determine which beam 215 to select. Thus, the UE 115-a may select a narrow beam 215 (also referred to herein as an "improved beam") for future communications with the base station 105-a. The narrow beam 215 may be selected from the narrow beams 215-a, 215-b, and 215-c via which the reference signal 220 was transmitted. The beam 215 may be selected based on feedback information from base station 105-a, the feedback information being based on the reference signals 220 on data channel 225, and the selected beam 215 may be more refined than the wide beam 210, which may enable better communications quality than the beam 210.

The data channel 225 (e.g., a PUSCH or PDSCH) may be formatted or configured with multiple durations each associated with at least one reference signal (e.g., DMRS) to allow beam refinement based on the data channel. This formatting will be described in greater detail with reference to FIG. 3. The beam refinement procedure described herein may be configured at the base station 105-a and UE 115-a through one or more RRC messages. In some examples, the configuration may indicate the data channel structure and a feedback procedure. Additionally or alternatively, an indication from the base station 105-a may be sent to UE 115-a to initialize the beam refinement procedure. In some cases, the UE 115-a may transmit an MCS request to the base station 105-a, for example, based on receiving the beam refinement indication. The MCS request may include an indication to lower the MCS based on the reduction of data resources (e.g., due to their reallocation to reference signals used for beam refinement) based on the beam refinement indication. In some cases, UE 115-a may autonomously adjust the coding rate of its data channel (e.g., PUSCH) based on determining a number of beams 215 to sweep from the indication.

Figure 3:
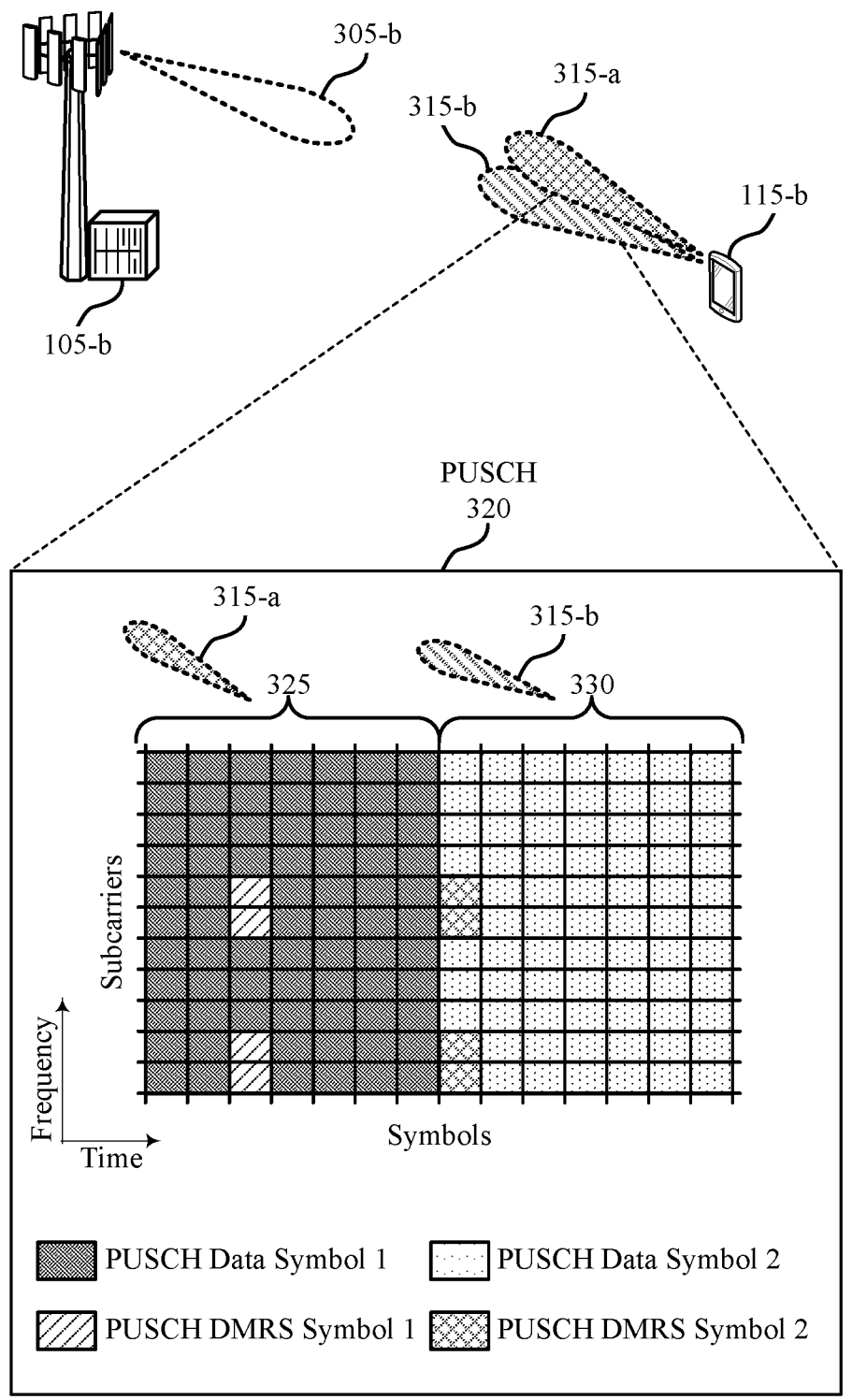
FIG. 3 illustrates an example of a data channel structure that supports techniques for using a data channel for beam refinement in accordance with aspects of the present disclosure.

FIG. 3 illustrates an example of a data channel structure 300 that supports techniques for using a data channel for beam refinement in accordance with aspects of the present disclosure. In some examples, data channel structure 300 may implement aspects of wireless communications system 100 and 200. The examples described herein may be from the perspective of the first wireless device being a UE 115-b and the second wireless device being a base station 105-b, however, the following description may also apply to the perspective of the first wireless device being a base station 105-*b* and the second wireless device being a UE 115-*b*. As described herein, some aspects relate to improving the efficiency of beam refinement using a data channel.

After completing initial acquisition (e.g., a P1 procedure) of an SSB from beam 305-*b* of base station 105-*b* via a wide beamwidth beam at UE 115-*b*, the UE 115-*b* and base station 105-*b* may communicate (e.g., share data) on data channels (e.g., PUSCH and PDSCH). The UE 115-*b* may refine its wide beamwidth beam (e.g., a P3 procedure) from initial acquisition to a narrow beam 315-*a* or 315-*b*, or may manage its narrow beams 315 (e.g., a P3 procedure) by evaluating the quality of narrow beams 315-*a* or 315-*b*. The base station 105-*b* and UE 115-*b* may be configured to use DMRS of a data channel for this beam refinement. For example, a data channel (e.g., PXSCH, which may include PDSCH, PUSCH, or other data channels) structure may be configured in which one or more PXSCH symbols may be used by one or more different narrow beams 315 to assist with beam training.

The UE 115-*b* may receive a beam refinement indication from base station 105-*b*. The UE 115-*b* may determine a structure of PUSCH 320 to transmit to the base station 105-*b* based on the configuration and beam refinement indication. For example, PUSCH 320 may include two RE groups: a first RE group 325 and a second RE group 330. The first RE group 325 may include data and associated DMRS. The first RE group 325 may be transmitted via a first beam 315-*a* from the UE 115-*b*. The second RE group 330 may include data and associated DMRS non-overlapping with the first RE group 325. The second RE group 330 may be transmitted via a second beam 315-*b* from the UE 115-*b*. Additional RE groups may be present in PUSCH 320 for transmission by additional beams 315. Each RE group 325 and 330 may correspond to the same or different data transmitted by a wireless device. For example, the first RE group 325 may correspond to a first portion of data and the second RE group 330 may correspond to a second portion of the data. In other examples, the first RE group 325 may correspond to first data and the second RE group 330 may correspond to second data that is the same or different from the first data. As a result, each reference signal (e.g., DMRS) transmitted (e.g., within respective RE groups and using different beams) may likewise correspond to the same or different data.

The base station 105-*b* may receive PUSCH 320 on beam 305-*b*. Base station 105-*b* may know the structure of the symbols in PUSCH 320 to be used for beam training based on the configuration. Thus, base station 105-*b* may perform beam measurements on the DMRS of both RE groups 325 and 330. Additionally, base station 105-*b* may decode the data for the PUSCH 320 based on channel estimation and demodulation of the DMRS. The beam measurements may include beam quality measurements such as RSRP. Based on the signaling included in PUSCH 320, the base station 105-*b* may determine an RSRP for the first beam 315-*a* from the DMRS of the first RE group 325 and an RSRP for the second beam 315-*b* from the DMRS of the second RE group 330. Base station may indicate beam management feedback to the UE 115-*b* based on the measurements of DMRS in PUSCH 320.

Similarly, the base station 105-*b* may refine its beams during a PDSCH transmission with the UE 115-*b*. The PDSCH transmission may include multiple RE groups with associated DMRS that the UE 115-*b* may use to provide beam refinement feedback to the base station 105-*b*. For a downlink beam sweep from the base station 105-*b*, the UE 115-*b* may indicate different types of channel quality information or channel quality indicators (CQIs) for different beam sweeps. For example, a relatively high CQI may indicate to the base station 105-*b* to sweep a relatively small number of beams. The base station 105-*b* may indicate in downlink control information (DCI) to the UE 115-*b* whether a beam sweep is desired and what type of beam sweep may be performed. Additionally or alternatively, the UE 115-*b* may perform beam sweeping and not indicate any CQI information and retransmit (e.g., using HARQ) for any losses in SNR.

Figure 4:
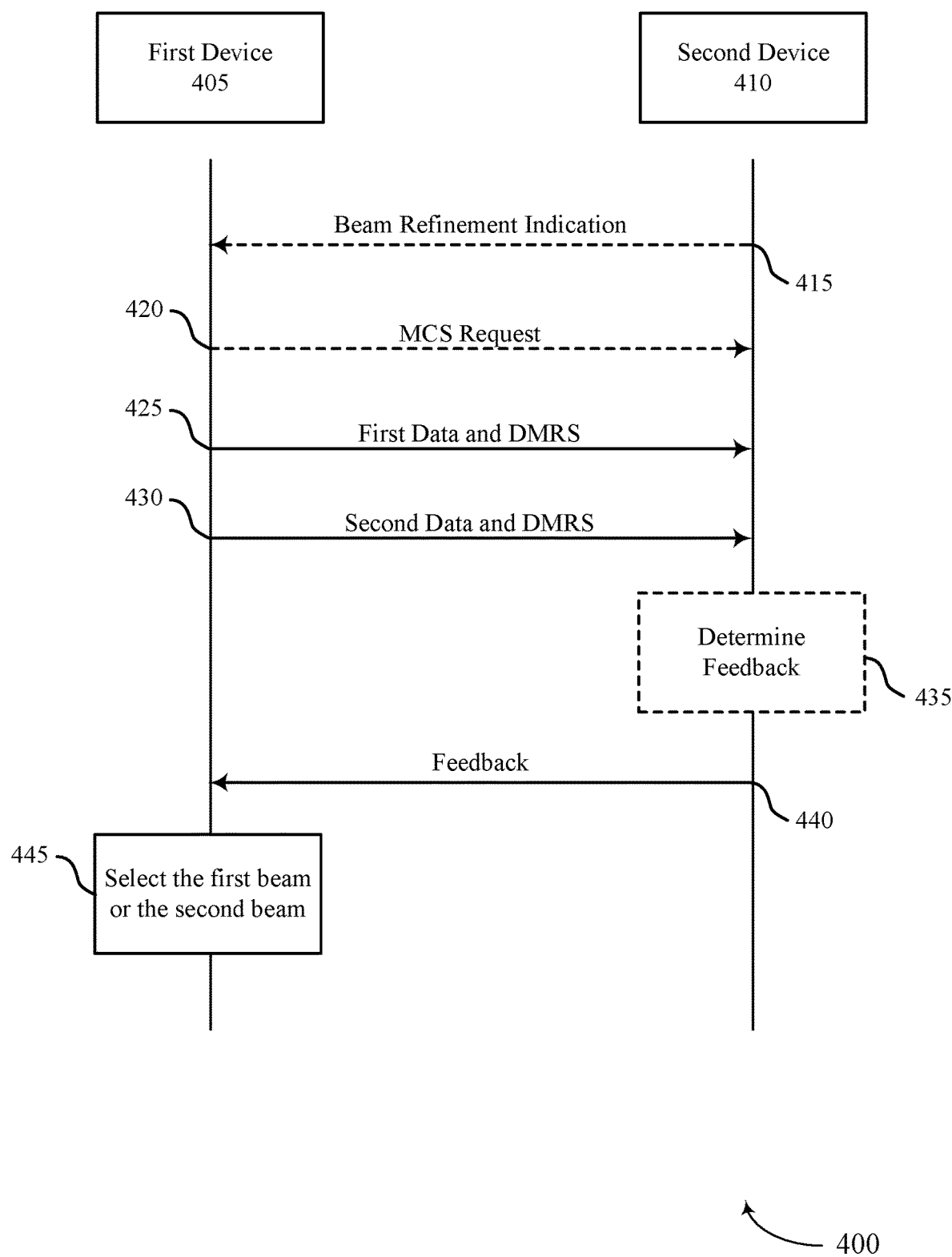
FIG. 4 illustrates an example of a process flow in a system that supports techniques for using a data channel for beam refinement in accordance with aspects of the present disclosure.

FIG. 4 illustrates an example of a process flow 400 in a system that supports techniques for using a data channel for beam refinement in accordance with aspects of the present disclosure. In some examples, process flow 400 may implement aspects of wireless communications system 100. Process flow 400 may include a first device 405 and a second device 410, which may be examples of a UE 115 and base station 105 as described herein with reference to FIGS. 1-3. For example, the first device 405 may be an example of a UE 115 as described herein, and the second device 410 may be an example of a base station 105 as described herein. In another example, the first device 405 may be an example of a base station 105 as described herein, and the second device 410 may be an example of a UE 115 as described herein.

In the following description of the process flow 400, the operations between the first device 405 and the second device 410 may be performed in a different order than the order shown, or the operations performed by the first device 405 and the second device 410 may be performed in different orders or at different times. Some operations may also be left out of the process flow 400, or other operations may be added to the process flow 400. It is to be understood that while the first device 405 and the second device 410 are shown performing a number of the operations of process flow 400, any wireless device may perform the operations shown.

At 415, the second device 410 may transmit and the first device 405 may receive an indication to perform beam refinement, where transmitting the first reference signal at 425 and the second reference signal at 430 is based on the indication. In some examples, the indication may include a beam sweep configuration for dynamic beam refinement procedures using the data channel. The beam sweep configuration may indicate a data channel slot structure for beam refinement using the first reference signal and the second reference signal. The beam sweep configuration may indicate a number of beams to sweep for beam refinement. In some cases, the second device may transmit the beam refinement indication based on receiving a feedback configuration for reporting beam feedback associated with beam refinement via a data channel.

At 420, the first device 405 may transmit and the second device 410 may receive an MCS request for adjusting an MCS based on receiving the indication to perform the beam refinement at 415.

At 425, the first device 405 may transmit, via a first beam, and the second device 410 may receive a first set of data and a first reference signal associated with the data on a data channel for beam refinement. In some examples, the first set of data and the first reference signal are transmitted in a first set of symbols. The data channel may be a PUSCH if the first device 405 is a UE 115, or the data channel may be a PDSCH if the first device 405 is a base station 105.

At 430, the first device 405 may transmit, via a second beam, a second set of data and a second reference signal on the data channel for beam refinement that are received by the second device 410. In some examples, the second set of data and the second reference signal are transmitted in a second set of symbols. The first reference signal and the second reference signal may each be transmitted within a slot time interval of the data channel. That is, the first reference signal may be transmitted within a first slot time interval and the second reference signal may be transmitted within a second slot time interval. The first reference signal and the second reference signal may be DMRS.

At 435, the second device 410 may determine beam refinement feedback information for the first beam and the second beam based on measuring a first RSRP of the first reference signal and measuring a second RSRP of the second reference signal. In some examples, the beam refinement feedback information includes an indication of the first RSRP and the second RSRP. In some cases, the beam refinement feedback information may include an indication that the first beam is a preferred beam based at least on part on the first RSRP being greater than the second RSRP.

At 440, the second device 410 may transmit and the first device 405 may receive beam refinement feedback information for the first beam and the second beam based on transmitting the first reference signal and the second reference signal on the data channel. In some cases, the feedback is received via a control information message, an RRC message, or a MAC-CE.

At 445, the first device 405 may select the first beam or the second beam for subsequent communication based on the received beam refinement feedback information at 440.

Figure 5:
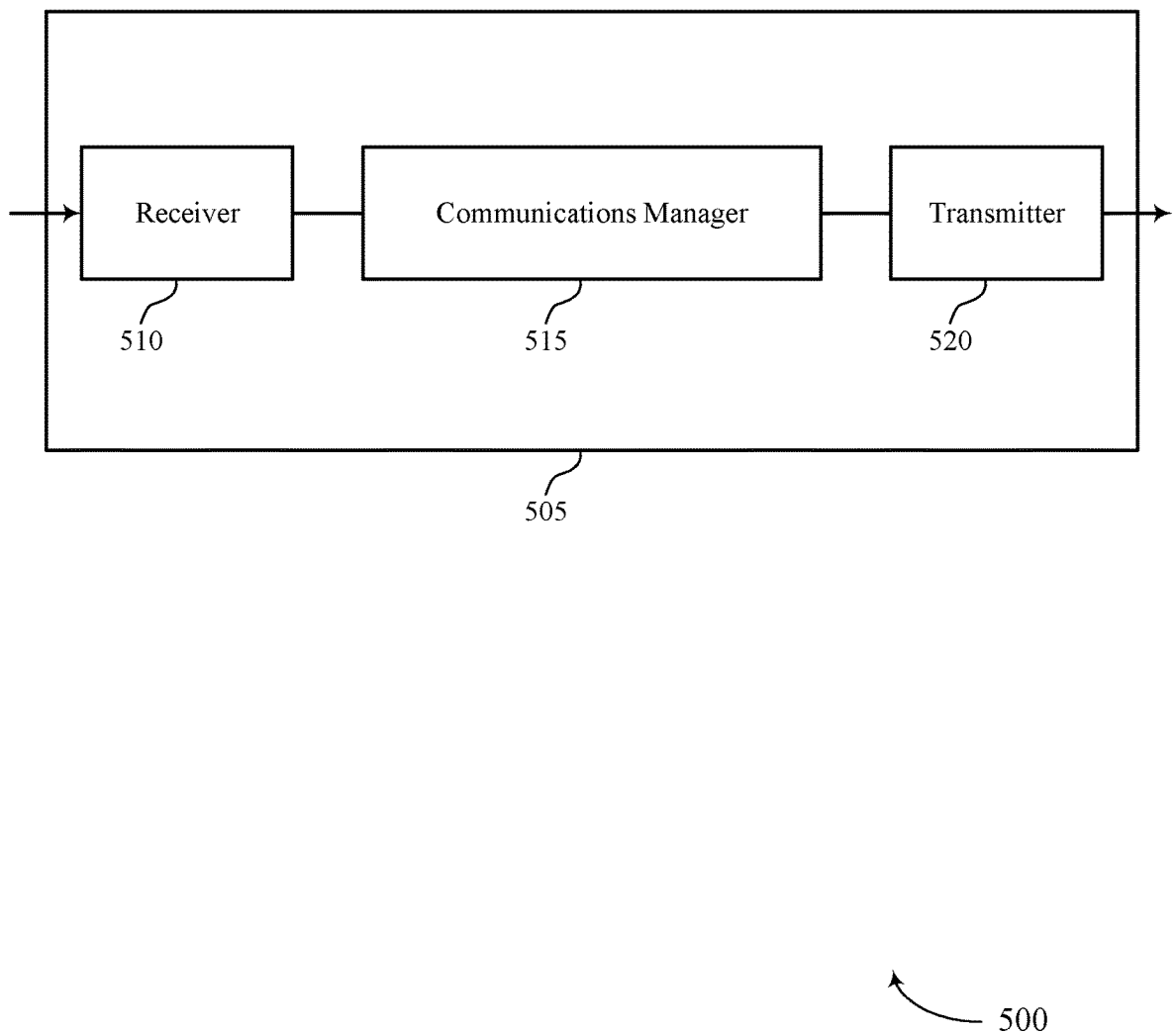
FIGS. 5 and 6 show diagrams of devices that support techniques for using a data channel for beam refinement in accordance with aspects of the present disclosure.

FIG. 5 shows a diagram 500 of a device 505 that supports techniques for using a data channel for beam refinement in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to techniques for using a data channel for beam refinement, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may transmit, via a first beam, a first set of data and a first reference signal associated with the data on a data channel for beam refinement, transmit, via a second beam, a second set of data and a second reference signal on the data channel for beam refinement, and receive, from a second wireless device, beam refinement feedback information for the first beam and the second beam based on transmitting the first reference signal and the second reference signal on the data channel.

The communications manager 515 may also receive, via a first beam of a first wireless device, a first set of data and a first reference signal associated with the data on a data channel for beam refinement, receive, via a second beam of the first wireless device, a second set of data and a second reference signal on the data channel for beam refinement, and transmit, to the first wireless device, beam refinement feedback information for the first beam and the second beam based on receiving the first reference signal and the second reference signal on the data channel. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for using a data channel for beam refinement. The device 505 may use data resources for DMRSs, which may enable the device 505 to perform beam refinement more quickly (e.g., as compared to using CSI-RSs or SRSs). Faster beam refinement procedures may allow for improved SNR and a higher MCS, which may improve communications performance and efficiency after beam refinement.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
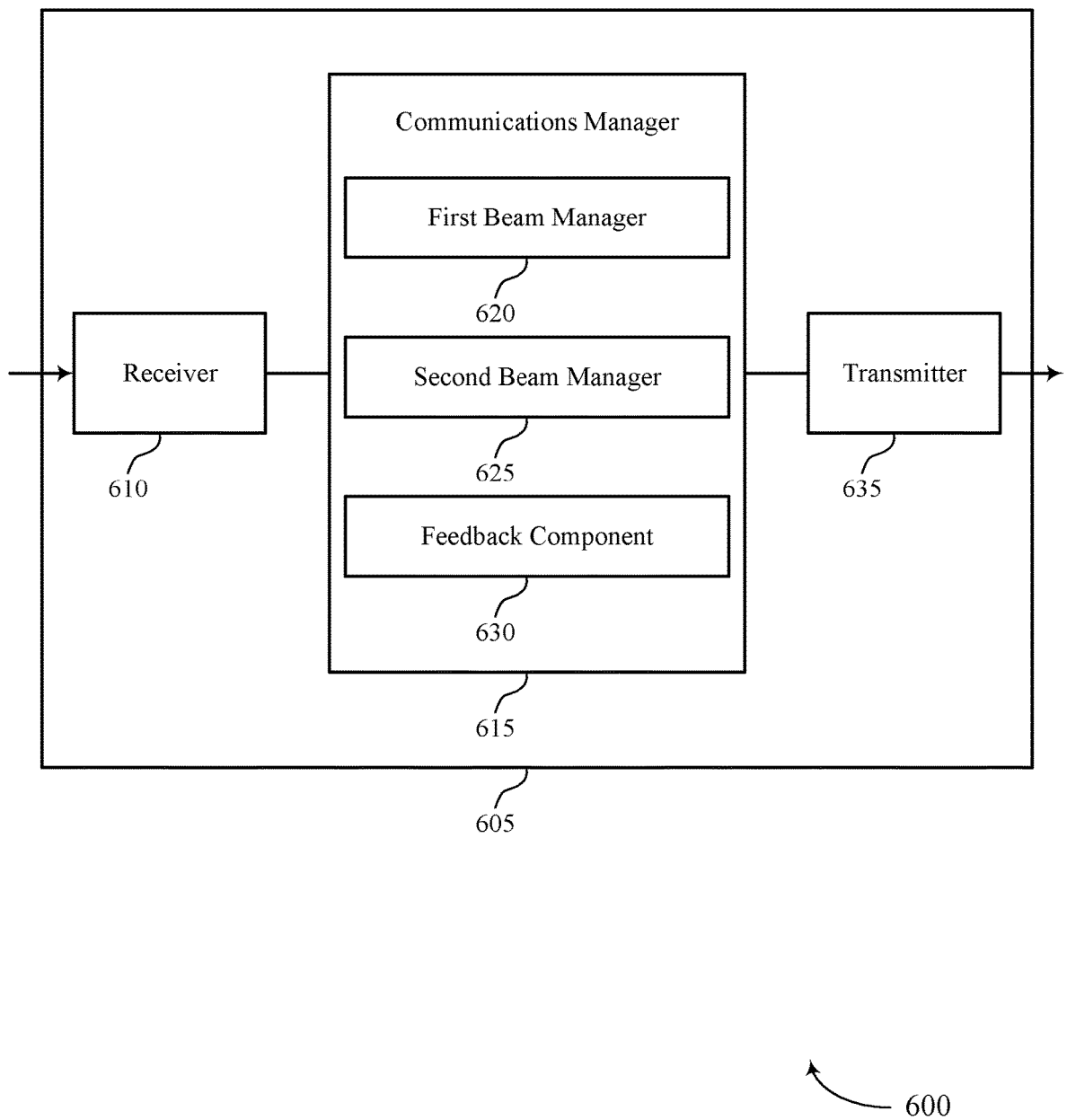

FIG. 6 shows a diagram 600 of a device 605 that supports techniques for using a data channel for beam refinement in accordance with aspects of the present disclosure. The device 605 may be an example of aspects of a device 505, a UE 115, or a base station 105 as described herein. The device 605 may include a receiver 610, a communications manager 615, and a transmitter 635. The device 605 may also include a processor. Each of these components may be in communication with one another (e.g., via one or more buses).

Receiver 610 may receive information such as packets, user data, or control information associated with various information channels (e.g., control channels, data channels, and information related to techniques for using a data channel for beam refinement, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a first beam manager 620, a second beam manager 625, and a feedback component 630. The communications manager 615 may be an example of aspects of the communications manager 810 or 910 as described herein.

The first beam manager 620 may transmit, via a first beam, a first set of data and a first reference signal associated with the data on a data channel for beam refinement. The first beam manager 620 may receive, via a first beam of a first wireless device, a first set of data and a first reference signal associated with the data on a data channel for beam refinement.

The second beam manager 625 may transmit, via a second beam, a second set of data and a second reference signal on the data channel for beam refinement. The second beam manager 625 may receive, via a second beam of the first wireless device, a second set of data and a second reference signal on the data channel for beam refinement.

The feedback component 630 may receive, from a second wireless device, beam refinement feedback information for the first beam and the second beam based on transmitting the first reference signal and the second reference signal on the data channel. The feedback component 630 may transmit, to the first wireless device, beam refinement feedback information for the first beam and the second beam based on receiving the first reference signal and the second reference signal on the data channel.

Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
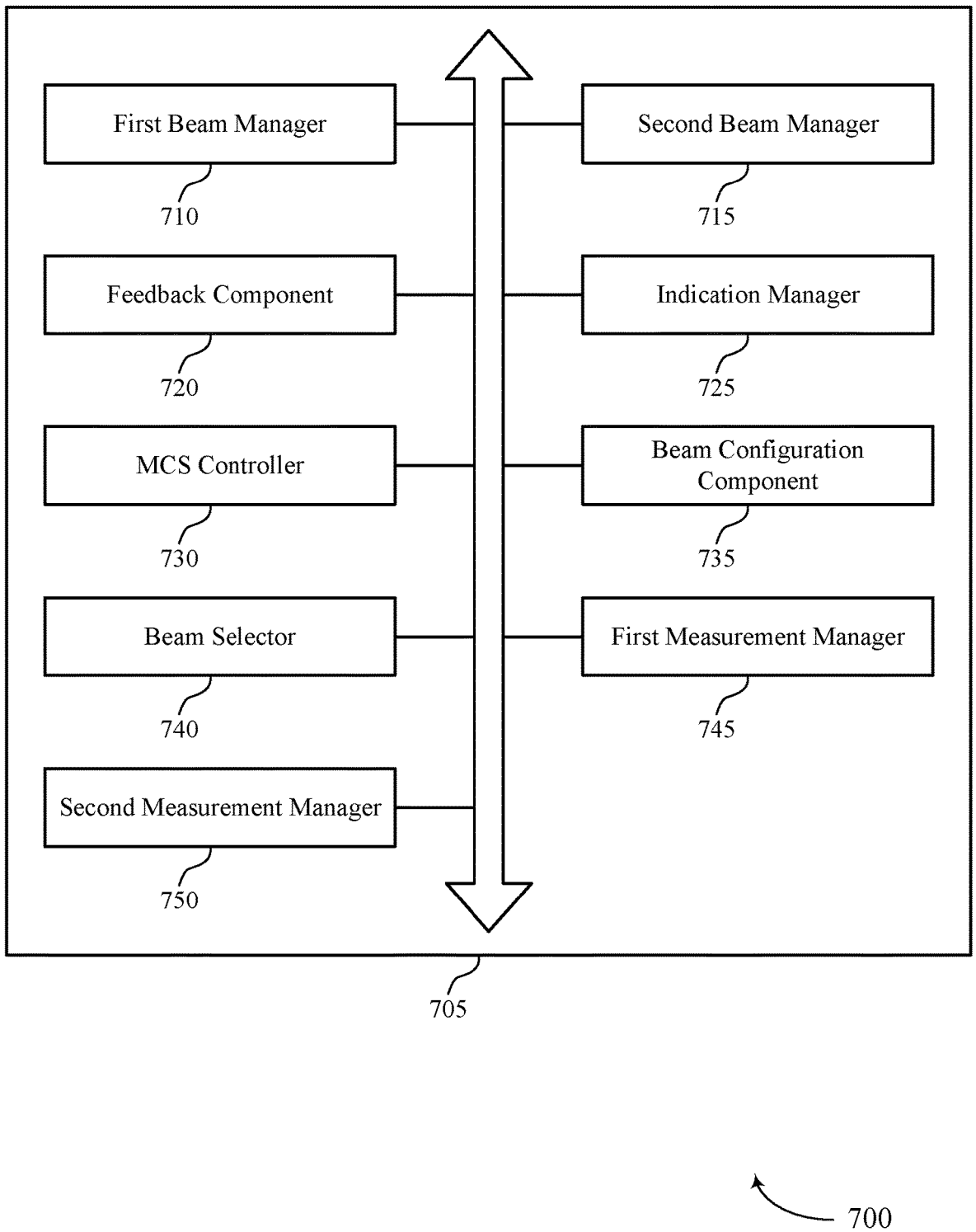
FIG. 7 shows a diagram of a communications manager that supports techniques for using a data channel for beam refinement in accordance with aspects of the present disclosure.

FIG. 7 shows a diagram 700 of a communications manager 705 that supports techniques for using a data channel for beam refinement in accordance with aspects of the present disclosure. The communications manager 705 may be an example of aspects of a communications manager 515, a communications manager 615, or a communications manager 810 described herein. The communications manager 705 may include a first beam manager 710, a second beam manager 715, a feedback component 720, an indication manager 725, an MCS controller 730, a beam configuration component 735, a beam selector 740, a first measurement manager 745, and a second measurement manager 750. Each of these modules may communicate, directly or indirectly, with one another (e.g., via one or more buses).

The first beam manager 710 may transmit, via a first beam, a first set of data and a first reference signal associated with the data on a data channel for beam refinement. In some examples, the first beam manager 710 may receive, via a first beam of a first wireless device, a first set of data and a first reference signal associated with the data on a data channel for beam refinement. In some cases, the first reference signal and the second reference signal include DMRSs. In some cases, the first wireless device is a user equipment, and where the data channel is a PUSCH. In some cases, the first wireless device is a base station, and where the data channel is a PDSCH. In some cases, the first set of data and the first reference signal are received in a first set of symbols, and where the second set of data and the second reference signal are received in a second set of symbols. In some cases, the first reference signal and the second reference signal are each received within a slot time interval of the data channel. In some cases, the second wireless device is a user equipment, and where the data channel is a PDSCH. In some cases, the second wireless device is a base station, and where the data channel is a PUSCH.

The second beam manager 715 may transmit, via a second beam, a second set of data and a second reference signal on the data channel for beam refinement. In some examples, the second beam manager 715 may receive, via a second beam of the first wireless device, a second set of data and a second reference signal on the data channel for beam refinement.

The feedback component 720 may receive, from a second wireless device, beam refinement feedback information for the first beam and the second beam based on transmitting the first reference signal and the second reference signal on the data channel. In some examples, the feedback component 720 may transmit, to the first wireless device, beam refinement feedback information for the first beam and the second beam based on receiving the first reference signal and the second reference signal on the data channel. In some examples, the feedback component 720 may receive a feedback configuration for reporting beam feedback associated with beam refinement via a data channel. In some cases, the feedback is received via a control information message, a radio resource control message, or a medium access control-control element. In some cases, the beam refinement feedback information includes an indication of the first RSRP and the second RSRP. In some cases, the beam refinement feedback information includes an indication that the first beam is a preferred beam based at least on part on the first RSRP being greater than the second RSRP. In some cases, the feedback is transmitted via a control information message, a radio resource control message, or a medium access control-control element.

The indication manager 725 may receive an indication to perform beam refinement, where transmitting the first reference signal and the second reference signal is based on the indication. In some examples, the indication manager 725 may transmit an indication to perform beam refinement.

The MCS controller 730 may transmit an MCS request for adjusting an MCS based on receiving the indication to perform the beam refinement. In some examples, the MCS controller 730 may receive an MCS request for adjusting an MCS based on transmitting the indication to perform the beam refinement.

The beam configuration component 735 may receive a beam sweep configuration for dynamic beam refinement procedures using the data channel. In some examples, the beam configuration component 735 may transmit a beam sweep configuration for dynamic beam refinement procedures using the data channel. In some cases, the beam sweep configuration indicates a data channel slot structure for beam refinement using the first reference signal and the second reference signal. In some cases, the beam sweep configuration indicates a number of beams to sweep for beam refinement. In some cases, the first set of data and the first reference signal are transmitted in a first set of symbols, and where the second set of data and the second reference signal are transmitted in a second set of symbols. In some cases, the first reference signal and the second reference signal are each transmitted with a slot time interval of the data channel. In some cases, the beam sweep configuration indicates a data channel slot structure for beam refinement using the first reference signal and the second reference signal. In some cases, the beam sweep configuration indicates a number of beams to sweep for beam refinement.

The beam selector 740 may select the first beam or the second beam for subsequent communication based on the received beam refinement feedback information.

The first measurement manager 745 may measure a first RSRP of the first reference signal. In some cases, the first reference signal and the second reference signal are DMRSs.

The second measurement manager 750 may measure a second RSRP of the second reference signal.

Figure 8:
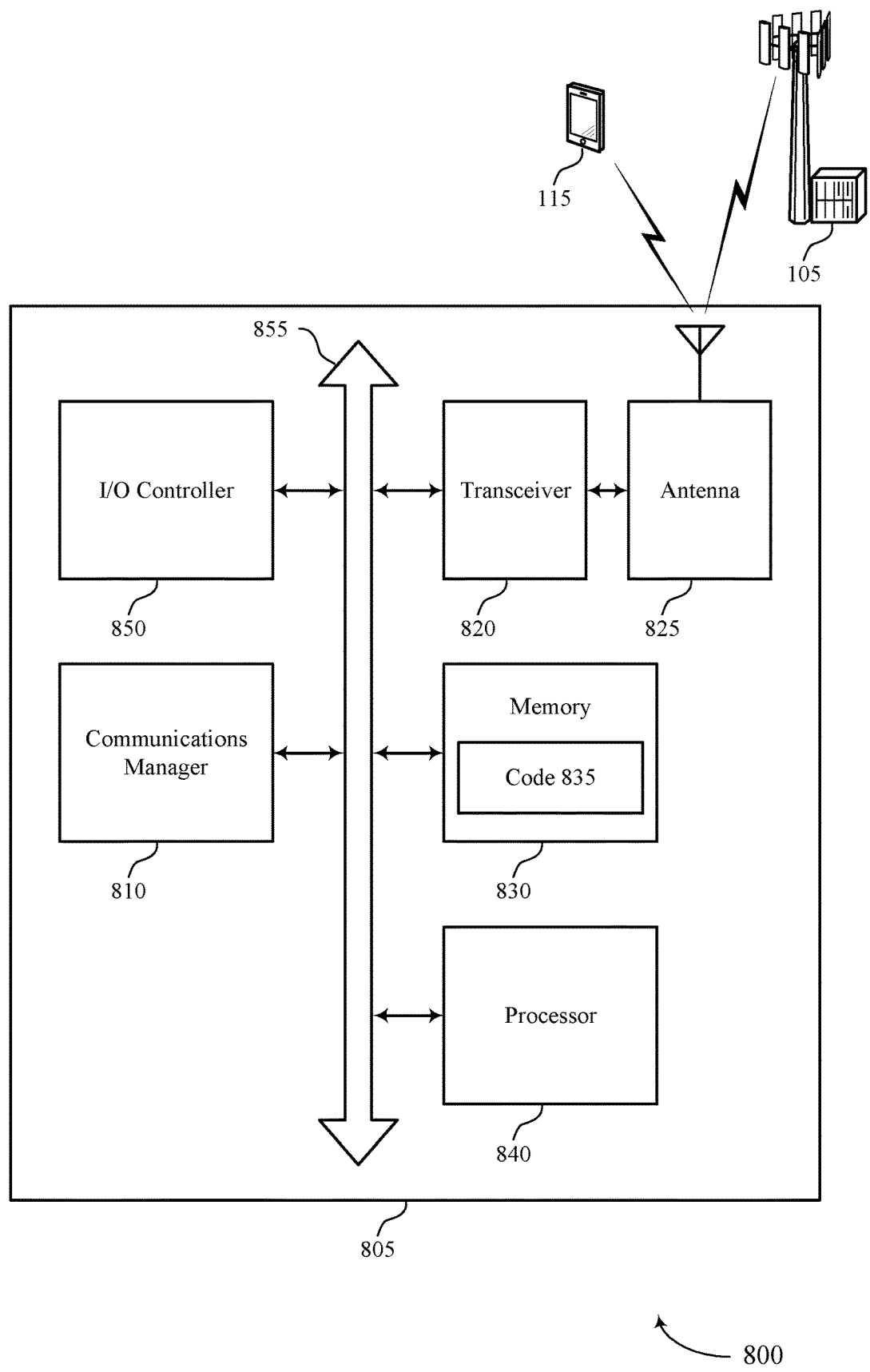
FIG. 8 shows a diagram of a system including a UE that supports techniques for using a data channel for beam refinement in accordance with aspects of the present disclosure.

FIG. 8 shows a diagram of a system 800 including a device 805 that supports techniques for using a data channel for beam refinement in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may transmit, via a first beam, a first set of data and a first reference signal associated with the data on a data channel for beam refinement, transmit, via a second beam, a second set of data and a second reference signal on the data channel for beam refinement, and receive, from a second wireless device, beam refinement feedback information for the first beam and the second beam based on transmitting the first reference signal and the second reference signal on the data channel. The communications manager 810 may also receive, via a first beam of a first wireless device, a first set of data and a first reference signal associated with the data on a data channel for beam refinement, receive, via a second beam of the first wireless device, a second set of data and a second reference signal on the data channel for beam refinement, and transmit, to the first wireless device, beam refinement feedback information for the first beam and the second beam based on receiving the first reference signal and the second reference signal on the data channel.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for using a data channel for beam refinement).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
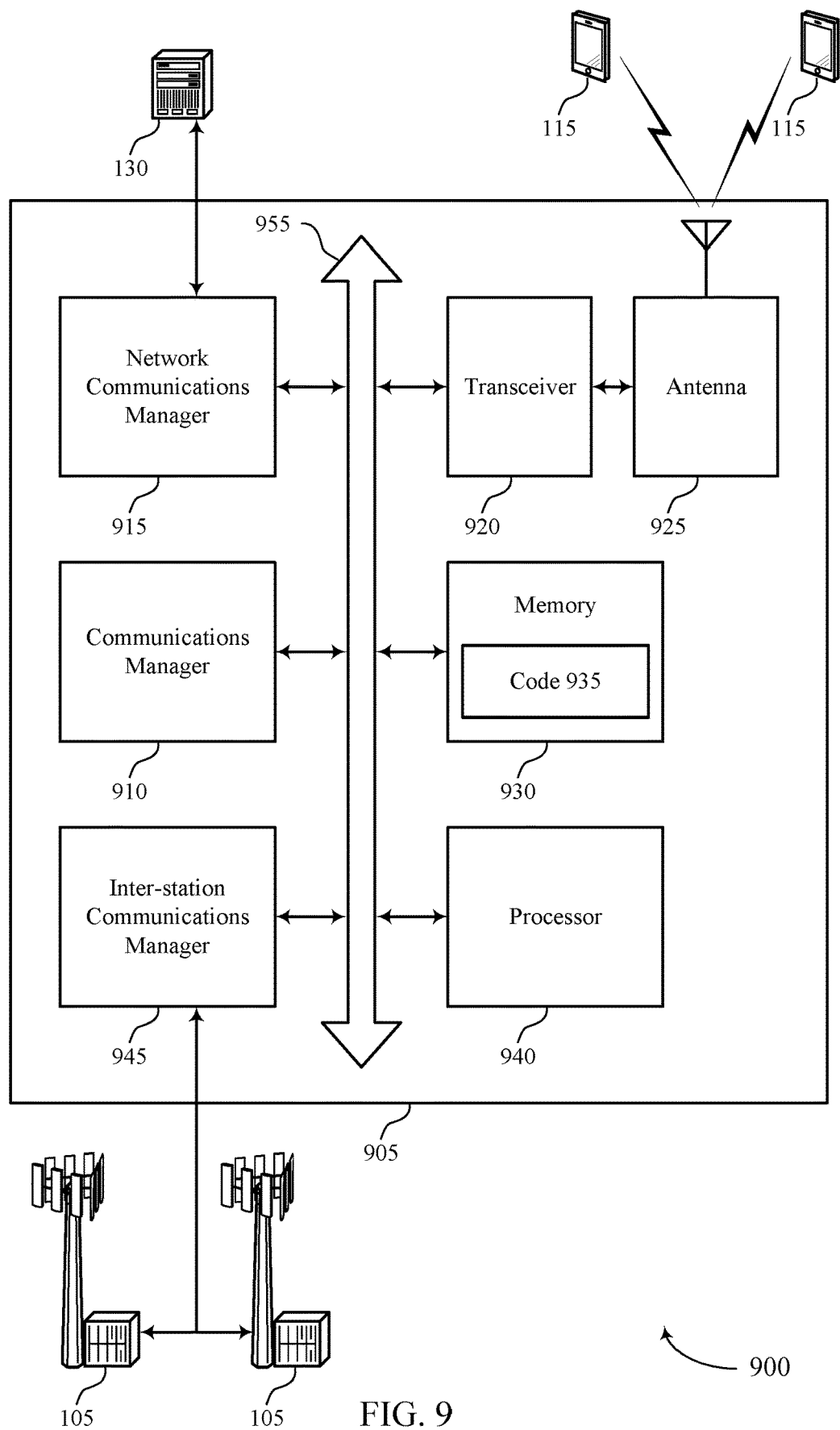
FIG. 9 shows a diagram of a system including a base station that supports techniques for using a data channel for beam refinement in accordance with aspects of the present disclosure.

FIG. 9 shows a diagram of a system 900 including a device 905 that supports techniques for using a data channel for beam refinement in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may transmit, via a first beam, a first set of data and a first reference signal associated with the data on a data channel for beam refinement, transmit, via a second beam, a second set of data and a second reference signal on the data channel for beam refinement, and receive, from a second wireless device, beam refinement feedback information for the first beam and the second beam based on transmitting the first reference signal and the second reference signal on the data channel. The communications manager 910 may also receive, via a first beam of a first wireless device, a first set of data and a first reference signal associated with the data on a data channel for beam refinement, receive, via a second beam of the first wireless device, a second set of data and a second reference signal on the data channel for beam refinement, and transmit, to the first wireless device, beam refinement feedback information for the first beam and the second beam based on receiving the first reference signal and the second reference signal on the data channel.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for using a data channel for beam refinement).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

By including or configuring the communications manager 915 in accordance with examples as described herein, the device 905 may support techniques for using a data channel for beam refinement. The device 905 may use data resources for DMRSs, which may enable the device 905 to perform beam refinement more quickly (e.g., as compared to using CSI-RSs or SRSs). Additionally, the device 905 may receive data resources DMRSs more frequently than control channel reference signals. Thus, the device 905 may reduce delays caused by inefficient or infrequent beam refinement procedures, which may in turn reduce network overhead and improve communications efficiency.

Figure 10:
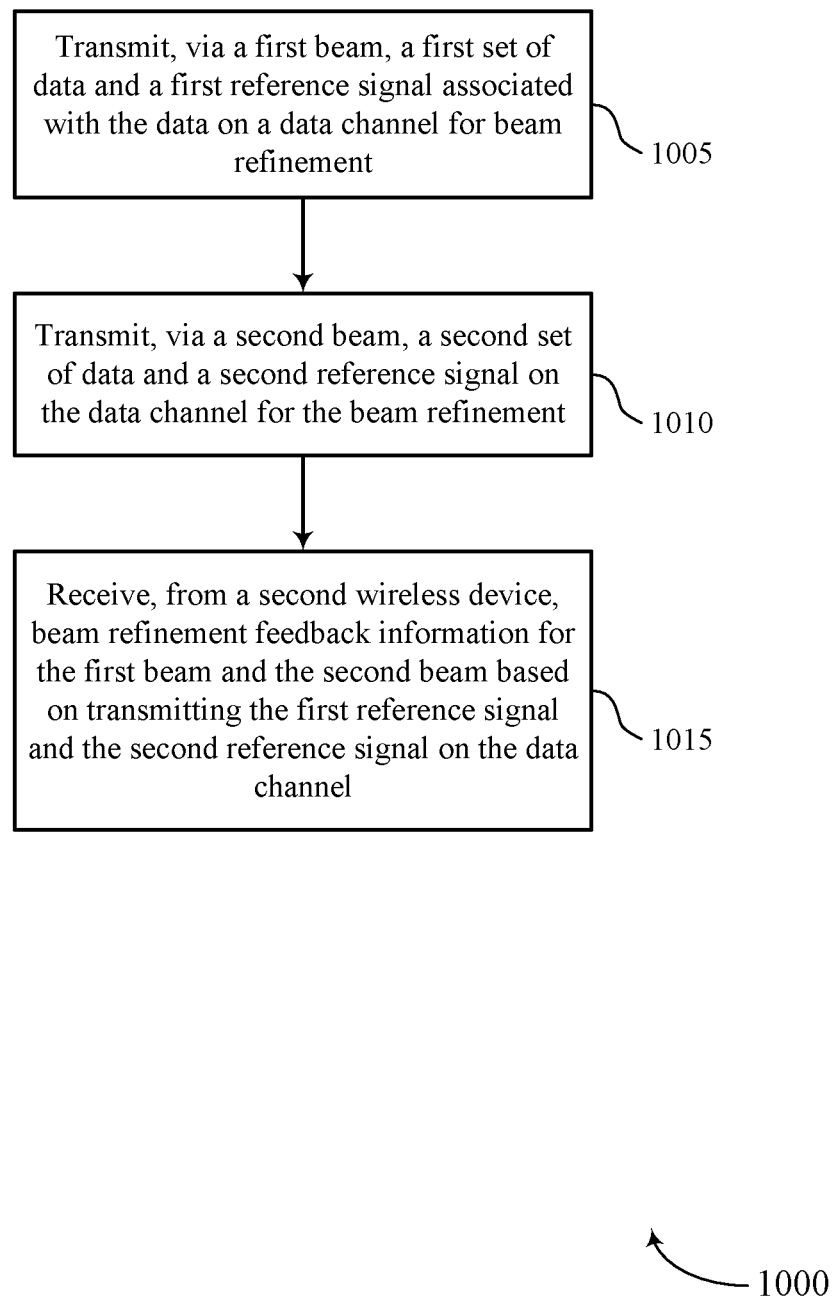
FIGS. 10 through 16 show flowcharts illustrating methods that support techniques for using a data channel for beam refinement in accordance with aspects of the present disclosure.

FIG. 10 shows a flowchart illustrating a method 1000 that supports techniques for using a data channel for beam refinement in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1005, the UE or base station may transmit, via a first beam, a first set of data and a first reference signal associated with the data on a data channel for beam refinement. The operations of 1005 may be performed according to the methods described herein. In some examples, aspects of the operations of 1005 may be performed by a first beam manager as described with reference to FIGS. 5 through 9.

At 1010, the UE or base station may transmit, via a second beam, a second set of data and a second reference signal on the data channel for beam refinement. The operations of 1010 may be performed according to the methods described herein. In some examples, aspects of the operations of 1010 may be performed by a second beam manager as described with reference to FIGS. 5 through 9.

At 1015, the UE or base station may receive, from a second wireless device, beam refinement feedback information for the first beam and the second beam based on transmitting the first reference signal and the second reference signal on the data channel. The operations of 1015 may be performed according to the methods described herein. In some examples, aspects of the operations of 1015 may be performed by a feedback component as described with reference to FIGS. 5 through 9.

Figure 11:
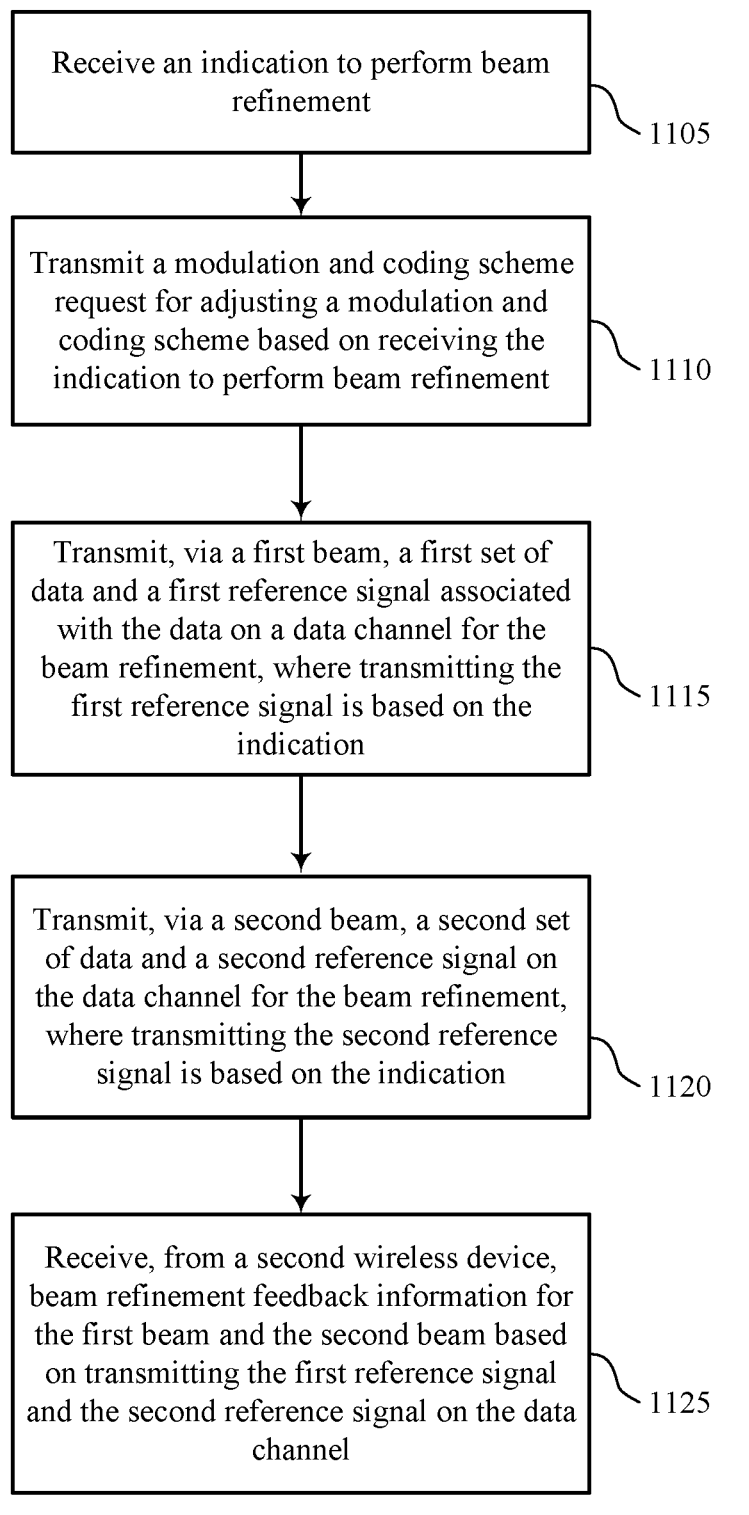

FIG. 11 shows a flowchart illustrating a method 1100 that supports techniques for using a data channel for beam refinement in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may receive an indication to perform beam refinement. The operations of 1105 may be performed according to the methods described herein. In some examples, aspects of the operations of 1105 may be performed by an indication manager as described with reference to FIGS. 5 through 9.

At 1110, the UE or base station may transmit an MCS request for adjusting an MCS based on receiving the indication to perform the beam refinement. The operations of 1110 may be performed according to the methods described herein. In some examples, aspects of the operations of 1110 may be performed by an MCS controller as described with reference to FIGS. 5 through 9.

At 1115, the UE or base station may transmit, via a first beam, a first set of data and a first reference signal associated with the data on a data channel for beam refinement, where transmitting the first reference signal is based on the indication. The operations of 1115 may be performed according to the methods described herein. In some examples, aspects of the operations of 1115 may be performed by a first beam manager as described with reference to FIGS. 5 through 9.

At 1120, the UE or base station may transmit, via a second beam, a second set of data and a second reference signal on the data channel for beam refinement, where transmitting the second reference signal is based on the indication. The operations of 1120 may be performed according to the methods described herein. In some examples, aspects of the operations of 1120 may be performed by a second beam manager as described with reference to FIGS. 5 through 9.

At 1125, the UE or base station may receive, from a second wireless device, beam refinement feedback information for the first beam and the second beam based on transmitting the first reference signal and the second reference signal on the data channel. The operations of 1125 may be performed according to the methods described herein. In some examples, aspects of the operations of 1125 may be performed by a feedback component as described with reference to FIGS. 5 through 9.

Figure 12:
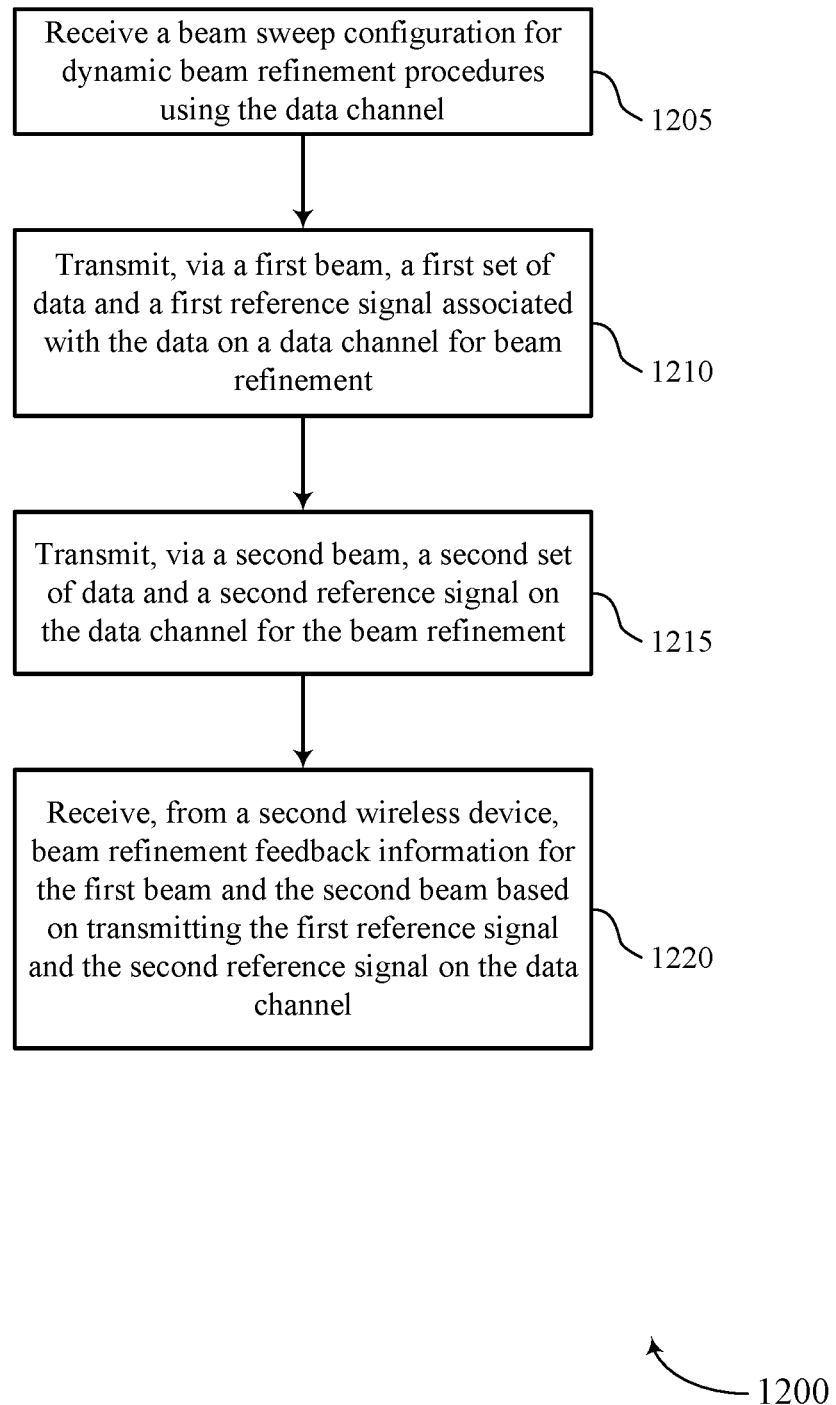

FIG. 12 shows a flowchart illustrating a method 1200 that supports techniques for using a data channel for beam refinement in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may receive a beam sweep configuration for dynamic beam refinement procedures using the data channel. The operations of 1205 may be performed according to the methods described herein. In some examples, aspects of the operations of 1205 may be performed by a beam configuration component as described with reference to FIGS. 5 through 9.

At 1210, the UE or base station may transmit, via a first beam, a first set of data and a first reference signal associated with the data on a data channel for beam refinement. The operations of 1210 may be performed according to the methods described herein. In some examples, aspects of the operations of 1210 may be performed by a first beam manager as described with reference to FIGS. 5 through 9.

At 1215, the UE or base station may transmit, via a second beam, a second set of data and a second reference signal on the data channel for beam refinement. The operations of 1215 may be performed according to the methods described herein. In some examples, aspects of the operations of 1215 may be performed by a second beam manager as described with reference to FIGS. 5 through 9.

At 1220, the UE or base station may receive, from a second wireless device, beam refinement feedback information for the first beam and the second beam based on transmitting the first reference signal and the second reference signal on the data channel. The operations of 1220 may be performed according to the methods described herein. In some examples, aspects of the operations of 1220 may be performed by a feedback component as described with reference to FIGS. 5 through 9.

Figure 13:
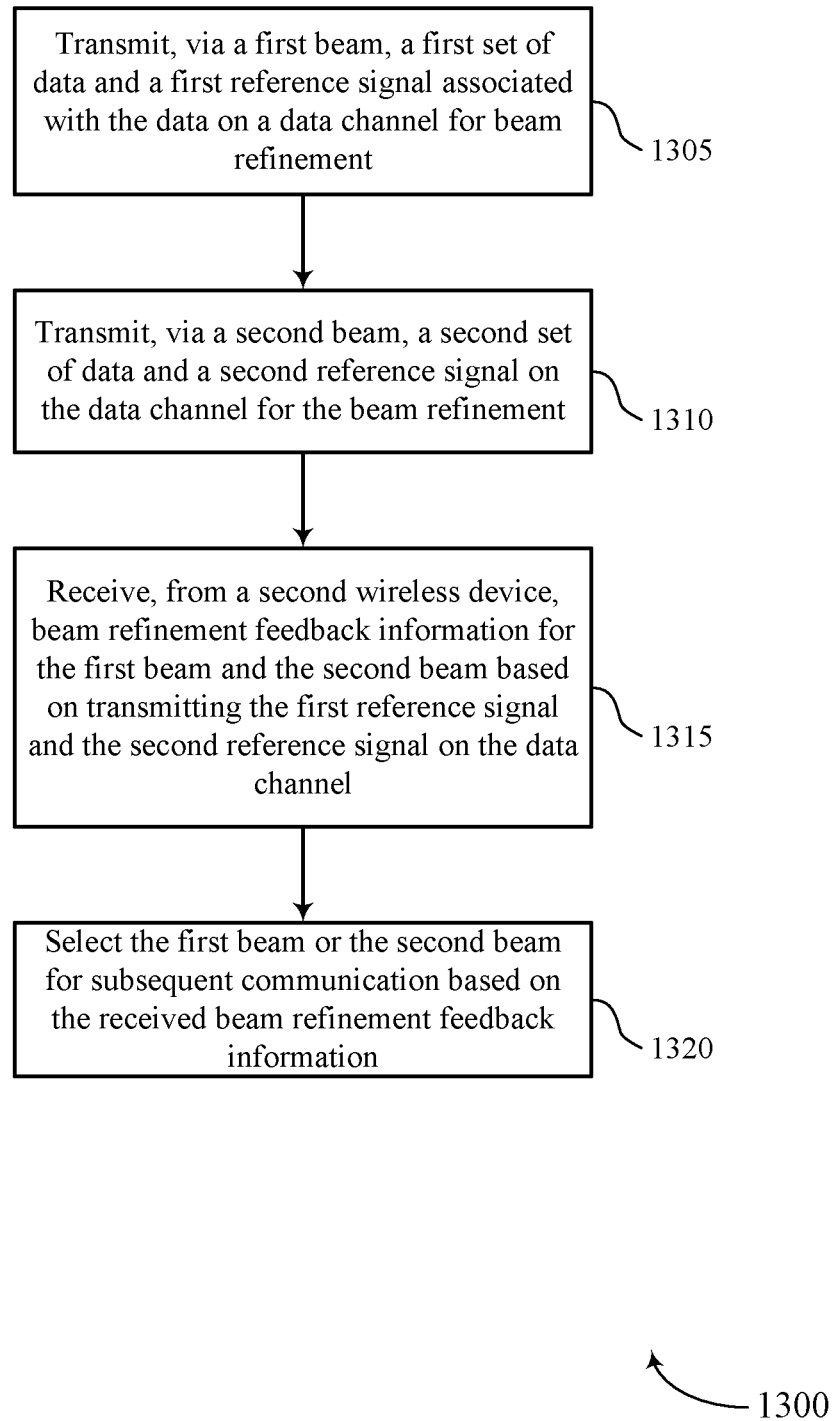

FIG. 13 shows a flowchart illustrating a method 1300 that supports techniques for using a data channel for beam refinement in accordance with aspects of the present disclosure. The operations of method 1300 may be implemented by a UE 115 or base station 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may transmit, via a first beam, a first set of data and a first reference signal associated with the data on a data channel for beam refinement. The operations of 1305 may be performed according to the methods described herein. In some examples, aspects of the operations of 1305 may be performed by a first beam manager as described with reference to FIGS. 5 through 9.

At 1310, the UE or base station may transmit, via a second beam, a second set of data and a second reference signal on the data channel for beam refinement. The operations of 1310 may be performed according to the methods described herein. In some examples, aspects of the operations of 1310 may be performed by a second beam manager as described with reference to FIGS. 5 through 9.

At 1315, the UE or base station may receive, from a second wireless device, beam refinement feedback information for the first beam and the second beam based on transmitting the first reference signal and the second reference signal on the data channel. The operations of 1315 may be performed according to the methods described herein. In some examples, aspects of the operations of 1315 may be performed by a feedback component as described with reference to FIGS. 5 through 9.

At 1320, the UE or base station may select the first beam or the second beam for subsequent communication based on the received beam refinement feedback information. The operations of 1320 may be performed according to the methods described herein. In some examples, aspects of the operations of 1320 may be performed by a beam selector as described with reference to FIGS. 5 through 9.

Figure 14:
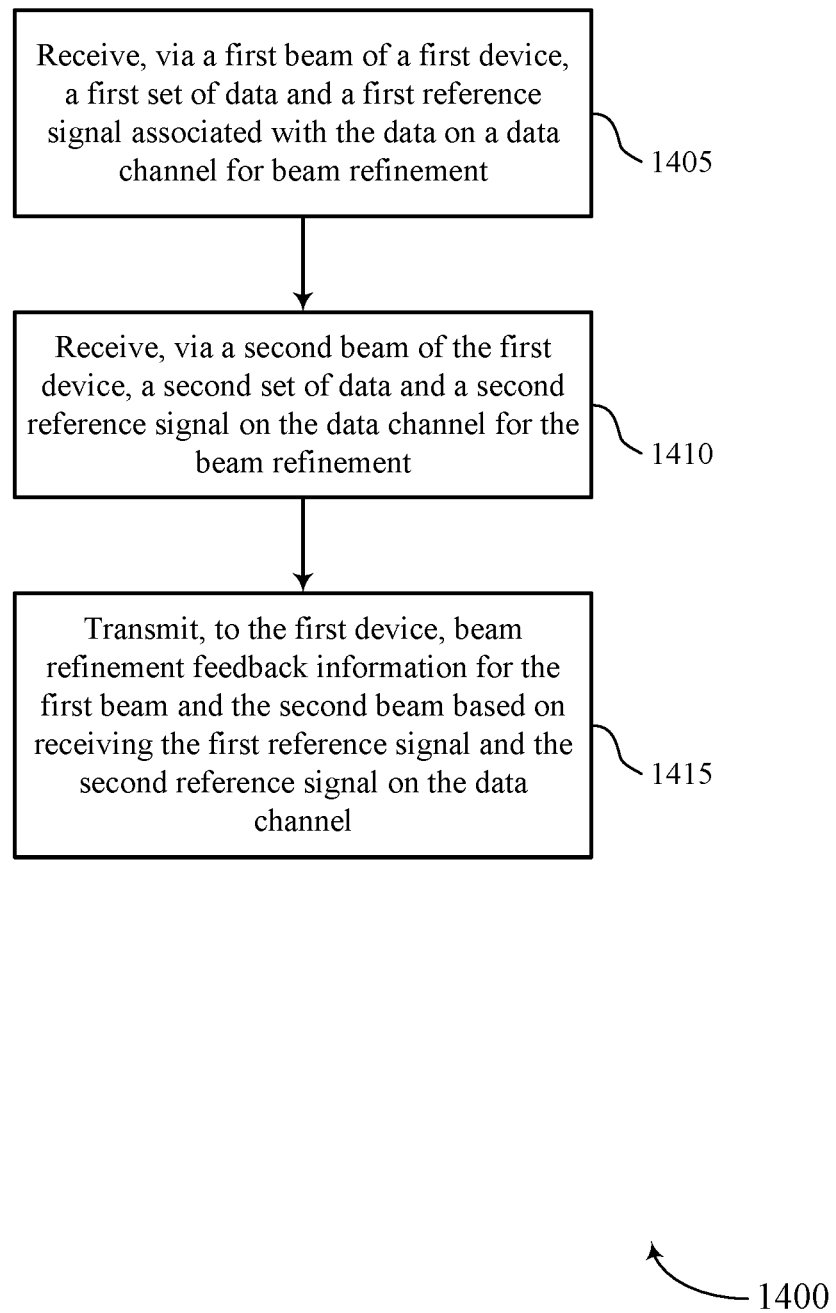

FIG. 14 shows a flowchart illustrating a method 1400 that supports techniques for using a data channel for beam refinement in accordance with aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may receive, via a first beam of a first wireless device, a first set of data and a first reference signal associated with the data on a data channel for beam refinement. The operations of 1405 may be performed according to the methods described herein. In some examples, aspects of the operations of 1405 may be performed by a first beam manager as described with reference to FIGS. 5 through 9.

At 1410, the UE or base station may receive, via a second beam of the first wireless device, a second set of data and a second reference signal on the data channel for beam refinement. The operations of 1410 may be performed according to the methods described herein. In some examples, aspects of the operations of 1410 may be performed by a second beam manager as described with reference to FIGS. 5 through 9.

At 1415, the UE or base station may transmit, to the first wireless device, beam refinement feedback information for the first beam and the second beam based on receiving the first reference signal and the second reference signal on the data channel. The operations of 1415 may be performed according to the methods described herein. In some examples, aspects of the operations of 1415 may be performed by a feedback component as described with reference to FIGS. 5 through 9.

Figure 15:
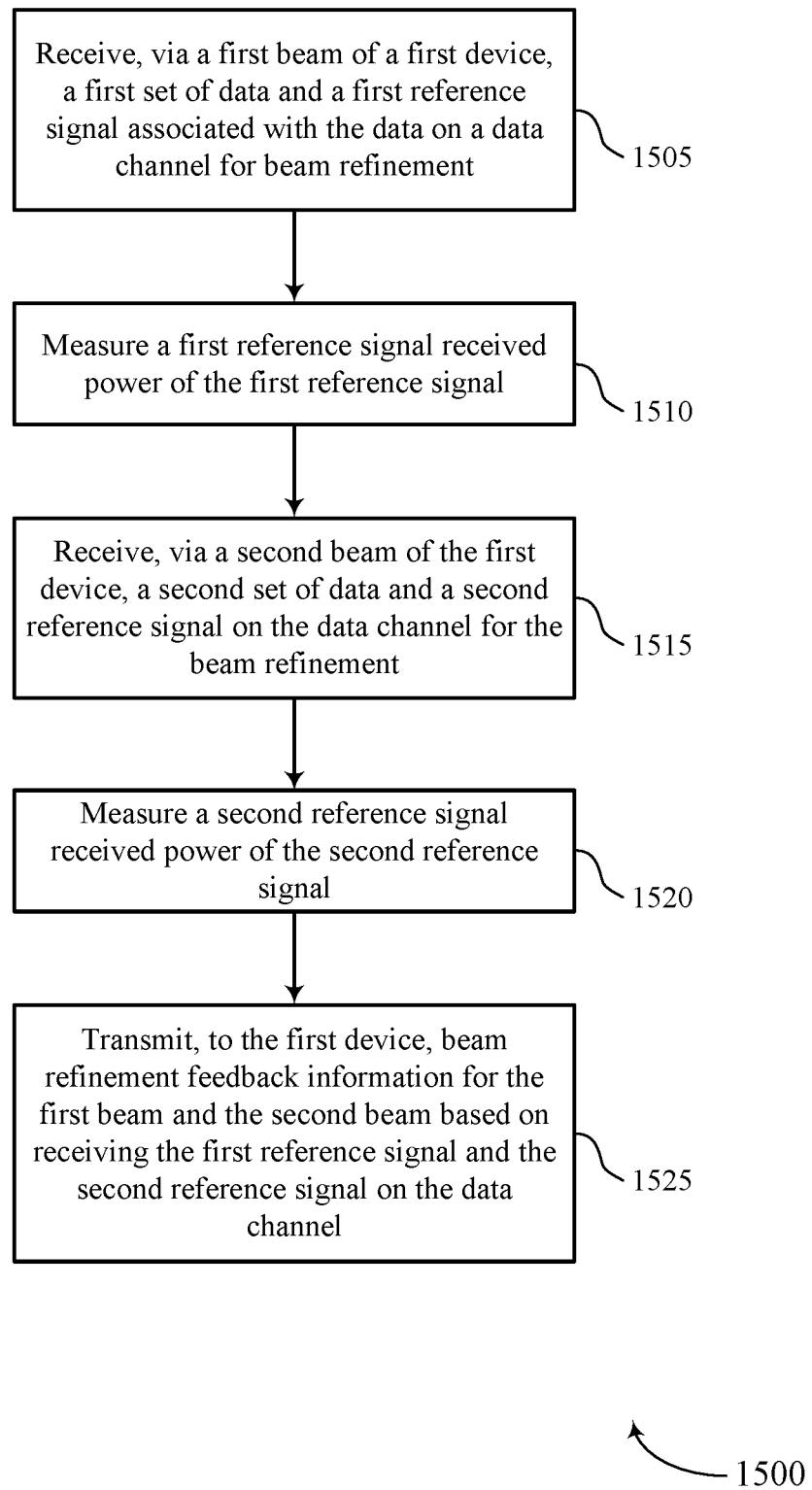

FIG. 15 shows a flowchart illustrating a method 1500 that supports techniques for using a data channel for beam refinement in accordance with aspects of the present disclosure. The operations of method 1500 may be implemented by a UE 115 or base station 105 or its components as described herein. For example, the operations of method 1500 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may receive, via a first beam of a first wireless device, a first set of data and a first reference signal associated with the data on a data channel for beam refinement. The operations of 1505 may be performed according to the methods described herein. In some examples, aspects of the operations of 1505 may be performed by a first beam manager as described with reference to FIGS. 5 through 9.

At 1510, the UE or base station may measure a first RSRP of the first reference signal. The operations of 1510 may be performed according to the methods described herein. In some examples, aspects of the operations of 1510 may be performed by a first measurement manager as described with reference to FIGS. 5 through 9.

At 1515, the UE or base station may receive, via a second beam of the first wireless device, a second set of data and a second reference signal on the data channel for beam refinement. The operations of 1515 may be performed according to the methods described herein. In some examples, aspects of the operations of 1515 may be performed by a second beam manager as described with reference to FIGS. 5 through 9.

At 1520, the UE or base station may measure a second RSRP of the second reference signal. The operations of 1520 may be performed according to the methods described herein. In some examples, aspects of the operations of 1520 may be performed by a second measurement manager as described with reference to FIGS. 5 through 9.

At 1525, the UE or base station may transmit, to the first wireless device, beam refinement feedback information for the first beam and the second beam based on receiving the first reference signal and the second reference signal on the data channel. The operations of 1525 may be performed according to the methods described herein. In some examples, aspects of the operations of 1525 may be performed by a feedback component as described with reference to FIGS. 5 through 9.

Figure 16:
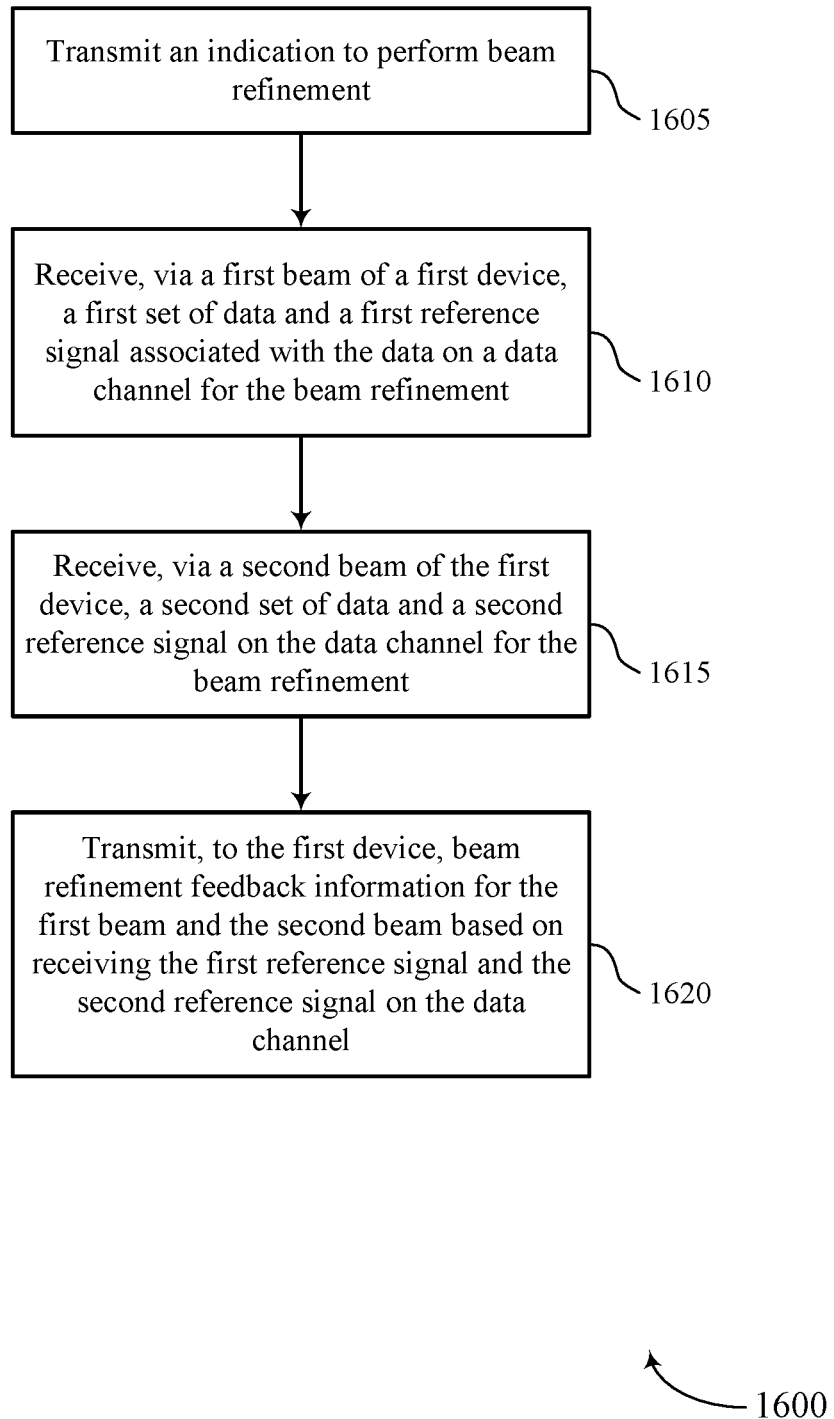

FIG. 16 shows a flowchart illustrating a method 1600 that supports techniques for using a data channel for beam refinement in accordance with aspects of the present disclosure. The operations of method 1600 may be implemented by a UE 115 or base station 105 or its components as described herein. For example, the operations of method 1600 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may transmit an indication to perform beam refinement. The operations of 1605 may be performed according to the methods described herein. In some examples, aspects of the operations of 1605 may be performed by an indication manager as described with reference to FIGS. 5 through 9.

At 1610, the UE or base station may receive, via a first beam of a first wireless device, a first set of data and a first reference signal associated with the data on a data channel for beam refinement. The operations of 1610 may be performed according to the methods described herein. In some examples, aspects of the operations of 1610 may be performed by a first beam manager as described with reference to FIGS. 5 through 9.

At 1615, the UE or base station may receive, via a second beam of the first wireless device, a second set of data and a second reference signal on the data channel for beam refinement. The operations of 1615 may be performed according to the methods described herein. In some examples, aspects of the operations of 1615 may be performed by a second beam manager as described with reference to FIGS. 5 through 9.

At 1620, the UE or base station may transmit, to the first wireless device, beam refinement feedback information for the first beam and the second beam based on receiving the first reference signal and the second reference signal on the data channel. The operations of 1620 may be performed according to the methods described herein. In some examples, aspects of the operations of 1620 may be performed by a feedback component as described with reference to FIGS. 5 through 9.

The following provides an overview of aspects of the present disclosure:

Aspect 1: A method for wireless communications at a first wireless device, comprising: transmitting, via a first beam, a first set of data and a first reference signal associated with the data on a data channel for beam refinement; transmitting, via a second beam, a second set of data and a second reference signal on the data channel for the beam refinement; and receiving, from a second wireless device, beam refinement feedback information for the first beam and the second beam based at least in part on transmitting the first reference signal and the second reference signal on the data channel.

Aspect 2: The method of aspect 1, further comprising: receiving an indication to perform the beam refinement, wherein transmitting the first reference signal and the second reference signal is based at least in part on the indication.

Aspect 3: The method of aspect 2, further comprising: transmitting an MCS request for adjusting an MCS based at least in part on receiving the indication to perform the beam refinement.

Aspect 4: The method of any of aspects 1 through 3, further comprising: receiving a beam sweep configuration for dynamic beam refinement procedures using the data channel.

Aspect 5: The method of aspect 4, wherein the beam sweep configuration indicates a data channel slot structure for the beam refinement using the first reference signal and the second reference signal.

Aspect 6: The method of any of aspects 4 through 5, wherein the beam sweep configuration indicates a number of beams to sweep for the beam refinement.

Aspect 7: The method of any of aspects 1 through 6, wherein the first set of data and the first reference signal are transmitted in a first set of symbols, and the second set of data and the second reference signal are transmitted in a second set of symbols.

Aspect 8: The method of any of aspects 1 through 7, wherein the first reference signal and the second reference signal are each transmitted with a slot time interval of the data channel.

Aspect 9: The method of any of aspects 1 through 8, further comprising: selecting the first beam or the second beam for subsequent communication based at least in part on the received beam refinement feedback information.

Aspect 10: The method of any of aspects 1 through 9, wherein the beam refinement feedback information is received via a control information message, an RRC message, or a MAC-CE.

Aspect 11: The method of any of aspects 1 through 10, wherein the first reference signal and the second reference signal comprise DMRSs.

Aspect 12: The method of any of aspects 1 through 11, wherein the first wireless device is a user equipment, and the data channel is a PUSCH.

Aspect 13: The method of any of aspects 1 through 11, wherein the first wireless device is a base station, and the data channel is a PDSCH.

Aspect 14: A method for wireless communications at a second wireless device, comprising: receiving, via a first beam of a first wireless device, a first set of data and a first reference signal associated with the data on a data channel for beam refinement; receiving, via a second beam of the first wireless device, a second set of data and a second reference signal on the data channel for the beam refinement; and transmitting, to the first wireless device, beam refinement feedback information for the first beam and the second beam based at least in part on receiving the first reference signal and the second reference signal on the data channel.

Aspect 15: The method of aspect 14, further comprising: measuring a first reference signal received power of the first reference signal; and measuring a second reference signal received power of the second reference signal.

Aspect 16: The method of aspect 15, wherein the beam refinement feedback information comprises an indication of the first reference signal received power and the second reference signal received power.

Aspect 17: The method of any of aspects 15 through 16, wherein the beam refinement feedback information comprises an indication that the first beam is a preferred beam based at least on part on the first reference signal received power being greater than the second reference signal received power.

Aspect 18: The method of any of aspects 14 through 17, further comprising: receiving a feedback configuration for reporting beam feedback associated with the beam refinement via the data channel.

Aspect 19: The method of any of aspects 14 through 18, further comprising: transmitting an indication to perform the beam refinement.

Aspect 20: The method of aspect 19, further comprising: receiving an MCS request for adjusting an MCS based at least in part on transmitting the indication to perform the beam refinement.

Aspect 21: The method of any of aspects 14 through 20, further comprising: transmitting a beam sweep configuration for dynamic beam refinement procedures using the data channel.

Aspect 22: The method of aspect 21, wherein the beam sweep configuration indicates a data channel slot structure for the beam refinement using the first reference signal and the second reference signal.

Aspect 23: The method of any of aspects 21 through 22, wherein the beam sweep configuration indicates a number of beams to sweep for the beam refinement.

Aspect 24: The method of any of aspects 14 through 23, wherein the first set of data and the first reference signal are received in a first set of symbols, and the second set of data and the second reference signal are received in a second set of symbols.

Aspect 25: The method of any of aspects 14 through 24, wherein the first reference signal and the second reference signal are each received within a slot time interval of the data channel.

Aspect 26: The method of any of aspects 14 through 25, wherein the beam refinement feedback information is transmitted via a control information message, an RRC message, or a MAC-CE.

Aspect 27: The method of any of aspects 14 through 26, wherein the first reference signal and the second reference signal are DMRSs.

Aspect 28: The method of any of aspects 14 through 27, wherein the second wireless device is a user equipment and the data channel is a PDSCH.

Aspect 29: The method of any of aspects 14 through 27, wherein the second wireless device is a base station and the data channel is a PUSCH.

Aspect 30: An apparatus for wireless communications at a first wireless device, comprising a processor; memory coupled with the processor; and instructions stored in the memory and executable by the processor to cause the apparatus to perform a method of any of aspects 1 through 13.

Aspect 31: An apparatus for wireless communications at a first wireless device, comprising at least one means for performing a method of any of aspects 1 through 13.

Aspect 32: A non-transitory computer-readable medium storing code for wireless communications at a first wireless device, the code comprising instructions executable by a processor to perform a method of any of aspects 1 through 13.

Aspect 33: An apparatus for wireless communications at a second wireless device, comprising a processor; memory coupled with the processor; and instructions stored in the memory and executable by the processor to cause the apparatus to perform a method of any of aspects 14 through 29.

Aspect 34: An apparatus for wireless communications at a second wireless device, comprising at least one means for performing a method of any of aspects 14 through 29.

Aspect 35: A non-transitory computer-readable medium storing code for wireless communications at a second wireless device, the code comprising instructions executable by a processor to perform a method of any of aspects 14 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first wireless device, comprising:

transmitting, via a first beam and in a first set of symbols, a first set of data and a first reference signal associated with the first set of data on a data channel, wherein the first reference signal is for beam refinement;

transmitting, via a second beam and in a second set of symbols, a second set of data and a second reference signal on the data channel, wherein the second reference signal is for the beam refinement; and receiving, from a second wireless device, beam refinement feedback information for the first beam and the second beam based at least in part on transmitting the first reference signal and the second reference signal on the data channel.

2. The method of claim 1, further comprising:
receiving an indication to perform the beam refinement, wherein transmitting the first reference signal and the second reference signal is based at least in part on the indication.

3. The method of claim 2, further comprising:
transmitting a modulation and coding scheme request for adjusting a modulation and coding scheme based at least in part on receiving the indication to perform the beam refinement.

4. The method of claim 1, further comprising:
receiving a beam sweep configuration for dynamic beam refinement procedures using the data channel.

5. The method of claim 4, wherein the beam sweep configuration indicates a data channel slot structure for the beam refinement using the first reference signal and the second reference signal.

6. The method of claim 4, wherein the beam sweep configuration indicates a number of beams to sweep for the beam refinement.

7. The method of claim 1, wherein the first reference signal and the second reference signal are each transmitted with a slot time interval of the data channel.

8. The method of claim 1, further comprising:
selecting the first beam or the second beam for subsequent communication based at least in part on the received beam refinement feedback information.

9. The method of claim 1, wherein the beam refinement feedback information is received via a control information message, a radio resource control message, or a medium access control-control element.

10. The method of claim 1, wherein the first reference signal and the second reference signal comprise demodulation reference signals.

11. The method of claim 1, wherein the first wireless device is a user equipment, and wherein the data channel is a physical uplink shared channel.

12. The method of claim 1, wherein the first wireless device is a network node, and wherein the data channel is a physical downlink shared channel.

13. A method for wireless communications at a second wireless device, comprising:

receiving, via a first beam of a first wireless device and in a first set of symbols, a first set of data and a first reference signal associated with the first set of data on a data channel, wherein the first reference signal is for beam refinement;

receiving, via a second beam of the first wireless device and in a second set of symbols, a second set of data and a second reference signal on the data channel, wherein the second reference signal is for the beam refinement; and transmitting, to the first wireless device, beam refinement feedback information for the first beam and the second beam based at least in part on receiving the first reference signal and the second reference signal on the data channel.

14. The method of claim 13, further comprising:
measuring a first reference signal received power of the first reference signal; and
measuring a second reference signal received power of the second reference signal.

15. The method of claim 14, wherein the beam refinement feedback information comprises an indication of the first reference signal received power and the second reference signal received power.

16. The method of claim 14, wherein the beam refinement feedback information comprises an indication that the first beam is a preferred beam based at least on part on the first reference signal received power being greater than the second reference signal received power.

17. The method of claim 13, further comprising:
receiving a feedback configuration for reporting beam feedback associated with the beam refinement via the data channel.

18. The method of claim 13, further comprising:
transmitting an indication to perform the beam refinement.

19. The method of claim 18, further comprising:
receiving a modulation and coding scheme request for adjusting a modulation and coding scheme based at least in part on transmitting the indication to perform the beam refinement.

20. The method of claim 13, further comprising:
transmitting a beam sweep configuration for dynamic beam refinement procedures using the data channel.

21. The method of claim 20, wherein the beam sweep configuration indicates a data channel slot structure for the beam refinement using the first reference signal and the second reference signal.

22. The method of claim 20, wherein the beam sweep configuration indicates a number of beams to sweep for the beam refinement.

23. The method of claim 13, wherein the first reference signal and the second reference signal are each received within a slot time interval of the data channel.

24. The method of claim 13, wherein the beam refinement feedback information is transmitted via a control information message, a radio resource control message, or a medium access control-control element.

25. The method of claim 13, wherein the first reference signal and the second reference signal are demodulation reference signals.

26. The method of claim 13, wherein:
the second wireless device is a user equipment and the data channel is a physical downlink shared channel; or
the second wireless device is a network node and the data channel is a physical uplink shared channel.

27. An apparatus for wireless communications at a first wireless device, comprising:
a processor,
memory coupled with the processor; and
instructions stored in the memory and executable by the processor to cause the apparatus to:
transmit, via a first beam and in a first set of symbols, a first set of data and a first reference signal associated with the first set of data on a data channel, wherein the first reference signal is for beam refinement;

transmit, via a second beam and in a second set of symbols, a second set of data and a second reference signal on the data channel, wherein the second reference signal is for the beam refinement; and receive, from a second wireless device, beam refinement feedback information for the first beam and the second beam based at least in part on transmitting the first reference signal and the second reference signal on the data channel.

28. An apparatus for wireless communications at a second wireless device, comprising:

a processor, memory coupled with the processor; and instructions stored in the memory and executable by the processor to cause the apparatus to:

receive, via a first beam of a first wireless device and in a first set of symbols, a first set of data and a first reference signal associated with the first set of data on a data channel, wherein the first reference signal is for beam refinement;

receive, via a second beam of the first wireless device and in a second set of symbols, a second set of data and a second reference signal on the data channel, wherein the second reference signal is for the beam refinement; and transmit, to the first wireless device, beam refinement feedback information for the first beam and the second beam based at least in part on receiving the first reference signal and the second reference signal on the data channel.

* * * * *